(12) United States Patent
Aoki et al.

(10) Patent No.: US 12,283,688 B2
(45) Date of Patent: Apr. 22, 2025

(54) NEGATIVE ELECTRODE FOR ELECTROCHEMICAL ELEMENT AND A LITHIUM ION SECONDARY BATTERY

(71) Applicant: Maxell, Ltd., Kyoto (JP)

(72) Inventors: Hiroyoshi Aoki, Otokuni-gun (JP); Hiroshi Abe, Otokuni-gun (JP); Seiji Ishizawa, Otokuni-gun (JP); Haruki Kamizori, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 802 days.

(21) Appl. No.: 16/978,745

(22) PCT Filed: Feb. 20, 2019

(86) PCT No.: PCT/JP2019/006200
§ 371 (c)(1),
(2) Date: Sep. 7, 2020

(87) PCT Pub. No.: WO2019/171942
PCT Pub. Date: Sep. 12, 2019

(65) Prior Publication Data
US 2021/0020918 A1     Jan. 21, 2021

(30) Foreign Application Priority Data

Mar. 7, 2018     (JP) .................................. 2018-040585

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/134* (2013.01); *H01M 4/386* (2013.01); *H01M 4/483* (2013.01);
(Continued)

(58) Field of Classification Search
CPC ...... H01M 4/364; H01M 4/134; H01M 4/386; H01M 4/483; H01M 4/625;
(Continued)

(56) References Cited

U.S. PATENT DOCUMENTS 9,005,824 B2* 4/2015 Kawamoto ....... H01M 10/0567
429/337
2009/0075173 A1* 3/2009 Jeong .................... H01M 4/364
429/231.95

(Continued)

FOREIGN PATENT DOCUMENTS

JP     2010-212228 A     9/2010
JP     2016-100054 A     5/2016
(Continued)

OTHER PUBLICATIONS

International Search Report dated May 28, 2019, issued in counterpart International Application No. PCT/JP2019/006200 (2 pages).

*Primary Examiner* — Christian Roldan
(74) *Attorney, Agent, or Firm* — WHDA, LLP

(57) ABSTRACT

The inventive negative electrode for the electrochemical element includes a negative electrode composition layer provided on at least one surface of a current collector made of a metal foil; in which the negative electrode composition layer includes material S comprising Si and a hardly-graphitizable carbon material as a negative electrode active material; in which assuming that the whole amount of the negative electrode active material contained in the negative electrode composition layer is 100 mass %, a ratio of the material S is 50 to 90 mass % and a ratio of the hardly-graphitizable carbon materials is 10 to 50 mass %. The inventive lithium ion secondary battery includes a positive electrode, a negative electrode, a separator and a nonaqueous electrolyte liquid, and the negative electrode is consti-
(Continued)

tuted by the negative electrode for the electrochemical element of the present invention.

7 Claims, 6 Drawing Sheets

(51) Int. Cl.
- *H01M 4/134* (2010.01)
- *H01M 4/38* (2006.01)
- *H01M 4/48* (2010.01)
- *H01M 4/62* (2006.01)
- *H01M 10/0525* (2010.01)

(52) U.S. Cl.
CPC ....... *H01M 4/625* (2013.01); *H01M 10/0525* (2013.01); *H01M 2004/027* (2013.01)

(58) Field of Classification Search
CPC ....... H01M 10/0525; H01M 2004/027; H01M 4/131; H01M 4/366; H01M 4/133; H01M 4/525; H01M 4/587; H01M 4/62; H01M 4/622; H01M 10/052; Y02E 60/10
USPC ......................................................... 429/218
See application file for complete search history.

(56) References Cited

U.S. PATENT DOCUMENTS

| | | | |
|---|---|---|---|
| 2010/0203392 A1* | 8/2010 | Yamada | H01M 4/62 |
| | | | 429/232 |
| 2011/0159370 A1 | 6/2011 | Inaba et al. | |
| 2016/0233485 A1* | 8/2016 | Watanabe | H01M 4/587 |
| 2016/0233489 A1 | 8/2016 | Uhm et al. | |
| 2017/0155167 A1* | 6/2017 | Abe | H01M 10/0525 |
| 2017/0324086 A1 | 11/2017 | Nitta et al. | |
| 2017/0338511 A1 | 11/2017 | Yamano et al. | |
| 2018/0053935 A1 | 2/2018 | Azami | |
| 2018/0358612 A1 | 12/2018 | Seki et al. | |

FOREIGN PATENT DOCUMENTS

| | | |
|---|---|---|
| JP | 2016-522552 A | 7/2016 |
| JP | 2017-168323 A | 9/2017 |
| JP | 2017-199510 A | 11/2017 |
| JP | 2018-6284 A | 1/2018 |
| WO | 2010/050507 A1 | 5/2010 |
| WO | 2016/076387 A1 | 5/2016 |
| WO | 2016/104489 A1 | 6/2016 |
| WO | 2016/152877 A1 | 9/2016 |
| WO | 2017/077986 A1 | 5/2017 |

\* cited by examiner

NEGATIVE ELECTRODE FOR ELECTROCHEMICAL ELEMENT AND A LITHIUM ION SECONDARY BATTERY

TECHNICAL FIELD

The present invention relates to a lithium ion secondary battery that can be restricted from swelling due to charge and discharge and is excellent in the charge discharge cycle characteristics. The present invention also relates to a negative electrode for electrochemical element which can constitute the lithium ion secondary battery.

BACKGROUND OF THE INVENTION

As lithium ion secondary batteries are characterized in having a high voltage and a high-capacity, further development is expected. Under the circumstances, in association with battery reactions, there have been improvements in various kinds of materials used for the lithium ion secondary batteries such as a positive electrode active material, a negative electrode active material, a nonaqueous electrolyte liquid, and a binder used in the positive electrode and the negative electrode, etc.

It has been recently demanded to make further improvements of lithium ion secondary batteries for use in portable devices having downsized and multi-functioned. As a result, it has been studied if graphite conventionally used as a negative electrode active material can be replaced with a material such as low crystalline carbon, Si (silicon) or Sn (tin), etc., (which is hereinafter referred to as a "high-capacity negative electrode materials") that can accommodate more amounts of Li (lithium).

However, generally such a high-capacity negative electrode material shows a very large amount of volume change due to charge and discharge. Thus, when using it in a battery, a negative electrode could transform largely in repeating charge and discharge, and as a result, the battery might swell or the battery properties might suddenly decrease.

Therefore, in non-aqueous secondary batteries such as lithium ion secondary batteries using high-capacity negative electrode materials, it has been studied to develop a technique to solve the problems caused by a volume change of the high-capacity negative electrode materials due to charge and discharge. For example, Patent Reference No. 1 reports a technique to restrict a capacity drop or swelling of a battery when repeating charge and discharge by providing a layer including an insulating material, which does not react with Li, on the surface of the layer including the high-capacity negative electrode active material, or by using polyimide, polyamide-imide or polyamide as a binder of the layer including the high-capacity negative electrode active material, as well as specifying the negative electrode current collector into a specified property.

Also, Patent References Nos. 2 and 3 report techniques to use a negative electrode active material including a material containing $SiO_x$, a high-capacity negative electrode material, including constituted elements of Si and O, along with graphite or hardly-graphitizable carbon in order to reduce a ratio of $SiO_x$ in the negative electrode, thereby restricting a capacity drop of the negative electrode as much as possible to improve a high-capacity of the battery and a charge discharge cycle characteristic of the battery. On the other hand, since the techniques reported in Patent References Nos. 2 and 3 must have considerably restricted a ratio of the high-capacity negative electrode material in all of the negative electrode active materials, it can be said to still have a room for further improvements.

PRIOR ART REFERENCES

Patent References

Patent Reference No. 1: International Patent Application Publication No. 2010-050507
Patent Reference No. 2: Japanese Laid-Open Patent Publication No. 2010-212228
Patent Reference No. 3: International Patent Publication No. 2016-152877

SUMMARY OF THE INVENTION

The Objectives to Solve by the Invention

The present invention has invented after considering the situations explained above, the present invention provides a lithium ion secondary battery that can restrict the generation of swelling due to charge and discharge and is excellent in the charge discharge cycle characteristics, as well as a negative electrode for electrochemical element which can constitute such a lithium ion secondary battery.

Means to Solve the Problem

The inventive negative electrode for the electrochemical element includes a negative electrode composition layer provided on at least one surface of a current collector made of a metal foil; in which the negative electrode composition layer includes material S comprising Si and a hardly-graphitizable carbon material as a negative electrode active material; in which assuming that the whole amount of the negative electrode active material contained in the negative electrode composition layer is 100 mass %, a ratio of the material S is 50 to 90 mass % and a ratio of the hardly-graphitizable carbon materials is 10 to 50 mass %.

Also, the inventive lithium ion secondary battery includes a positive electrode, a negative electrode, a separator and a nonaqueous electrolyte liquid. The negative electrode is constituted by the negative electrode for the electrochemical element of the present invention.

Effects of the Invention

According to the present invention, it can provide a lithium ion secondary battery that restricts the generation of swelling due to charge and discharge and is excellent in the charge discharge cycle characteristics, as well as a negative electrode for electrochemical element which can constitute the lithium ion secondary battery.

EMBODIMENTS TO CARRY OUT THE INVENTION

Figure 1:
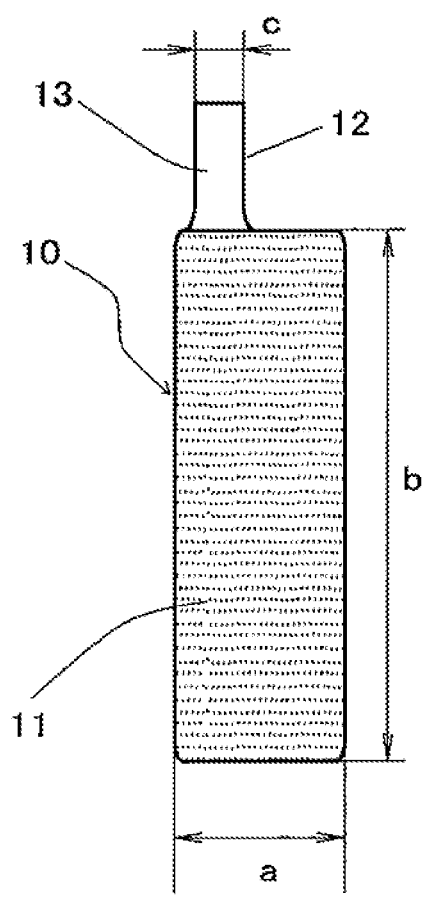
FIG. 1 is a plan view schematically showing an example of the positive electrode of the lithium ion secondary battery of the present invention.

The negative electrode for an electrochemical element of the present invention (which may be hereinafter simply referred to as a "negative electrode") includes a negative electrode composition layer formed on one surface or both surfaces of a current collector made of a metal foil. Also, the negative electrode composition layer includes material S comprising Si and a hardly-graphitizable carbon material as a negative electrode active material. When assuming that the whole amount of the negative electrode active material contained in the negative electrode composition layer is 100 mass %, a ratio of the material S is 50 mass % or more, and 90 mass % or less, and a ratio of the hardly-graphitizable carbon materials is 10 mass % or more, and 50 mass % or less.

Material S is so-called a high-capacity negative electrode material, and it can increase the capacity of the negative electrode by using it as an active material of the negative electrode, and therefore, it is possible to accomplish a high-capacity of an electrochemical element such as a lithium ion secondary battery by using such a negative electrode.

However, when using it in an electrochemical element such as a lithium ion secondary battery, the material Shows a large amount of volume change when subject to charge and discharge, and therefore the negative electrode could swell to cause the electrochemical element to be swollen, thereby causing a capacity drop of the electrochemical element due to repetition of charge and discharge.

Therefore, the negative electrode of the present invention should include the hardly-graphitizable carbon material, in addition to the material S, as a negative electrode active material in a ratio of 10 mass % or more, and 50 mass % or less in the whole amounts of the negative electrode active material. In this condition, even if the ratio of the material S is 50 mass % or more in the whole amounts of the negative electrode active material, the amount of deformation of the negative electrode can be lowered at the time of charge and discharge of the electrochemical element, thereby restricting the swelling of the electrochemical element and improving the charge discharge cycle characteristic of the electrochemical element.

As a result, a lithium ion secondary battery of the present invention using the negative electrode of the present invention can accomplish a high-capacity while it can restrict swelling of the battery and secure a good charge discharge cycle characteristic.

In the negative electrode of the present invention, the examples of the material S used as a negative electrode active material can include Si alone, a compound including Si, and a complex including Si.

Regarding the material S, the examples of the compound including Si can include an alloy with a metal other than Si (e.g., Mg, Cu and Ca, etc.).

Among the materials S, the examples of the complex including Si can include a material that includes Si and O as constituent elements but that does not include Li as a constituent element. Such an example can include a complex having a constitution formula of $SiO_x$ ($0.5 \leq x \leq 1.5$). In addition, the other examples of the complex including Si can include a complex of Si alone; a compound including Si; and a complex including Si that is in particular a complex including a component which has not been complexed with a carbon material (which may be hereinafter referred to as an "Si component material") and a carbon material.

The $SiO_x$ can include microcrystals or an amorphous phase of Si, and in such a case, the atomic ratio of Si and O is determined by including the microcrystals or the amorphous phase of Si. In other words, the $SiO_x$ can include one having a structure in which Si (e.g., microcrystalline Si) is dispersed in an amorphous $SiO_2$ matrix, and in this case the atomic ratio x can satisfy $0.5 \leq x \leq 1.5$ with including the amorphous $SiO_2$ and the Si dispersed therein. For example, when the material is provided as having a structure in which Si is dispersed in an amorphous $SiO_2$ matrix, and the molar ratio of $SiO_2$ and Si is 1:1, the structural formula of this material can be represented by SiO because x=1 is established. In the case of the material having such a structure, a peak resulting from the presence of Si (microcrystalline Si) might not be observed by means of, e.g., an X-ray diffraction analysis, but the presence of fine Si can be confirmed by means of observation of a transmission electron microscope.

It is preferable that the material S is a complex of an Si component material such as $SiO_x$, and a carbon material. The examples of such a complex of Si component material and carbon material can include one in which the surfaces of the Si component material particles are coated with a carbon material, or one in which an Si component material and a carbon material are granulated to become a complex. When the material S is a complex of Si component material and carbon material, favorable conductive network can be formed in the negative electrode.

For example, when an Si component material used as a material S is not complexed with a carbon material, as lowering a ratio of the material S in the whole amounts of the negative electrode active material, there can be increasing number of contact points to the other conductive material (e.g., a hardly-graphitizable carbon material, or a graphite which can be used along with material S as a negative electrode active material, and a conductive material used as a conductive assistant, etc.). Therefore, a formation of a conductive network in the negative electrode can become easier. However, when a complex of Si component material and carbon material is used as a material S, even if it does not contact the other conductive materials, a contact between the complexes can form a conductive network. Therefore, even if increasing a ratio of the material S (a complex of Si component material and carbon material) in the whole amounts of the negative electrode active material, a conductive network in the negative electrode can be easily formed.

Preferred examples of the carbon material which can be used to form a material S constituting a complex of a Si component material and a carbon material can include a low crystalline carbon, carbon nanotube, and a vapor grown carbon fiber, etc.

Specifically, it is preferable that the carbon material is at least one selected from the group consisting of a fibrous or coil-shaped carbon material, carbon black (including acetylene black and Ketjen Black), artificial graphite, easily-graphitizable carbon, and hardly-graphitizable carbon. The fibrous or coil-shaped carbon material is preferably used because it can easily form a conductive network and its surface area is large. It is preferable to use carbon black (including acetylene black and Ketjen Black), easily-graphitizable carbon and hardly-graphitizable carbon, because these materials have a high electrical conductivity and a high liquid-retaining property, and further because even in a condition where the particles of the material S expand and contract due to charge and discharge of a battery, these materials are likely to keep contact with the particles.

When the material S is of a complex of a Si component material and a carbon material, a ratio of the Si component material and the carbon materials in the material S in terms of 100 parts by mass of the Si component material can be as follows: The carbon material is preferably 3 parts by mass or more; and more preferably 5 parts by mass or more, and yet more preferably 7 parts by mass or more; and also, it is favorably 20 parts by mass or less, and more preferably 17 parts by mass or less. The reason thereof has not yet been confirmed, but when doped with Li ions and the ratio of the carbon material in the complex is adjusted in the range as defined above; it is possible to further improve the charge discharge cycle characteristic of the battery.

The material S, that is, a complex of a Si component material and a carbon material, can be obtained, e.g., in the following method.

When the composite is formed by coating the surfaces of the Si component material with a carbon material, for example, the particles of Si component material (for example, $SiO_x$ as explained before) and a hydrocarbon gas are heated in a gas phase, causing carbon produced by thermal decomposition of the hydrocarbon gas, thereby depositing it on the surfaces of the particles. Such a chemical vapor deposition (CVD) method allows the hydrocarbon gas to totally spread over the particles of the material S, thereby forming a thin uniform film (carbon material coating layer) including a carbon material having a conductivity on the surfaces of the particles. Therefore, it is possible to make particles of material S to be provided with a uniform conductivity even with a small amount of carbon material.

In the production of the material S coated with the carbon material, the treatment temperature (ambient temperature) of the CVD method varies depending on the type of the hydrocarbon gas and is generally 600 to 1200° C. In particular, the treatment temperature is preferably 700° C. or higher, and more preferably 800° C. or higher. This is because of the reasons that as a treatment temperature is set as a higher as possible, residual impurities can be reduced as well as a coating layer including a highly conductive carbon can be formed.

The examples of a liquid source of the hydrocarbon gas to be used can be of toluene, benzene, xylene, mesitylene or the like, but it is particularly preferable to use toluene because of its easy handling characteristics. The hydrocarbon gas can be obtained by evaporating the liquid source (e.g., by means of bubbling with a nitrogen gas). Also, a methane gas or acetylene gas can be used.

When an average particle diameter of material S is too small, the dispersibility of material S could decrease so that sufficient effects of the present invention might not be obtained. In addition, material S has a large volumetric change due to charge and discharge of the battery, and therefore, when an average particle diameter is too large, material S tends to collapse due to expansion and shrinkage (this phenomenon leads to a capacity deterioration of material S). Therefore, it is preferably 0.1 μm or more and 10 μm or less.

The examples of hardly-graphitizable carbon material (hard carbon) to be used as a negative electrode active material can include an amorphous carbon obtained by burning furfuryl alcohol resin (PFA), polyparaphenylene (PPP) or phenolic resin at a low temperature.

It is preferable that the hardly-graphitizable carbon material has $d_{002}$ of 0.34 to 0.42 nm in an X-ray diffraction. A hardly-graphitizable carbon material that satisfies the value of $d_{002}$ within the range defined above can accomplish an acceptance speed of Li ions particularly fast compared with graphites conventionally used in a negative electrode active material of a lithium ion secondary battery. Therefore, when such a hardly-graphitizable carbon material is used in a negative electrode active material to prepare a negative electrode to construct an electrochemical element, even if it is charged at a large current to increase a discharged amount of Li ions from the positive electrode per time, stagnation of Li ions can be restricted around the negative electrode, thereby restricting Li dendrites from depositing. As a result, it is possible to restrict generation of a capacity drop or short circuit at the time of quick charge.

The negative electrode active material can consist of material S and hardly-graphitizable carbon material, or can further include additional negative electrode active material. The examples of such additional negative electrode active material can include a carbon material such as graphite, thermolysis carbon, cokes, glassy carbons, fired material of an organic polymer compound, mesocarbon microbeads, carbon fiber and active carbon; Sn alone, an alloy including Sn, an oxide including Sn, etc. Among them, it is preferable to use graphite.

Assuming that the whole amount of the negative electrode active material included in the negative electrode composition layer is 100 mass %, a ratio of material S is preferably to satisfy 50 mass % or more, and more preferably to satisfy 60 mass % or more in view of increasing a capacity of the electrochemical element such as a lithium ion secondary battery using the negative electrode. Furthermore, when also assuming that the whole amount of the negative electrode active material included in the negative electrode composition layer is 100 mass %, a ratio of material S is preferably to satisfy 90 mass % or less, and more preferably to satisfy 80 mass % or less in view of containing the hardly-graphitizable carbon material in the negative electrode at a content to well secure the properties as explained before (a restriction effect of the swelling of the electrochemical element and an improvement effect of the charge discharge cycle characteristic).

Furthermore, when assuming that the whole amount of the negative electrode active material included in the negative electrode composition layer is 100 mass %, a ratio of the hardly-graphitizable carbon material is preferably to satisfy 10 mass % or more, and more preferably to satisfy 20 mass % or more in view of well securing the properties as explained before (a restriction effect of the swelling of the electrochemical element and an improvement effect of the charge discharge cycle characteristic). Furthermore, when assuming that the whole amount of the negative electrode active material included in the negative electrode composition layer is 100 mass %, a ratio of the hardly-graphitizable carbon material is preferably to satisfy 50 mass % or less, and more preferably to satisfy 40 mass % or less in view of avoiding a property to accomplish a high capacity from being restricted due to the reduction of the amount of material S.

In addition, when the carbon material in the material S, i.e., a complex of a Si component material and a carbon material body, is a hardly-graphitizable carbon material, a ratio of the material S in the whole amount of the negative electrode active material included in the negative electrode composition layer should be considered with including the amount of the hardly-graphitizable carbon material in the complex. Namely, regarding the ratio of the hardly-graphitizable carbon material in the whole amount of the negative electrode active material included in the negative electrode composition layer, the amount of the hardly-graphitizable carbon material constituting the complex, i.e., material S, should not be included.

The examples of the binder used in the negative electrode composition layer can include polyvinylidene fluoride (PVDF), polytetrafluoroethylene (PTFE), styrene-butadiene rubber (SBR), carboxymethyl-cellulose (CMC), polyimide, polyamide and polyamideimide, etc. It is, however, preferable to use a copolymer (which is hereinafter referred to as "copolymer (A)") having a unit represented by the following formula (1) and a unit represented by the following formula (2).

[Formula 1]

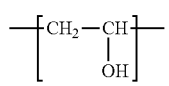

(1)

[Formula 2]

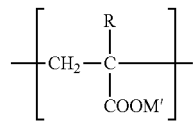

(2)

In the formula (2) above, R represents hydrogen or methyl group, and M' represents an alkali metal element.

The copolymer (A) has a binding strength and a flexibility more than those of SBR which is conventionally used as a binder of a negative electrode composition layer of a lithium ion secondary battery. Thus, even when a high-capacity negative electrode material such as material S is used as a negative electrode active material, it is possible to avoid a negative electrode active material from falling from the negative electrode composition layer or to avoid the negative electrode composition layer from peeling off from the current collector.

In addition, it could be possible that Li used in pre-doping into the negative electrode reacts with water to form lithium hydroxide, or it could be also possible that F contained in an electrolyte salt generally used in a nonaqueous electrolyte liquid of a lithium ion secondary battery reacts with water to form hydrogen fluoride. These could deteriorate the binder of the negative electrode composition layer. However, the copolymer (A) has a high tolerance against these phenomena, thereby making it difficult to cause such deterioration.

Thus, when the copolymer (A) is used as a binder of the negative electrode composition layer, it becomes difficult to cause a deterioration of the negative electrode, thereby improving a charge discharge cycle characteristic of a lithium ion secondary battery.

Furthermore, by using the copolymer (A) as a binder of a negative electrode composition layer, a load characteristic of a battery can be improved. It is considered because of the reason that when using the copolymer (A) as a binder of the negative electrode composition layer, a structure can be formed in such a way a nonaqueous electrolyte liquid may well percolate thereinside. In addition, by using the copolymer (A) as a binder, a Li deposition on the surfaces of the negative electrode, though it could occur in use of a battery, can be highly restricted.

The copolymer (A) having a unit represented by the following formula (1) and a unit represented by the following formula (2) can be obtained by polymerizing a vinyl ester and at least one of an acrylic ester and a methacrylic ester as a monomer to obtain a copolymer, followed by saponifying the copolymer.

The examples of the vinyl ester to obtain the copolymer (A) can include vinyl acetate, vinyl propionate and vinyl pivalate, and one kind or two or more kinds thereof can be used. Among these vinyl esters, it is more preferable to use vinyl acetate.

Also, a copolymer of a vinyl ester and at least one of an acrylic ester and a methacrylic ester can further include a unit derived from a monomer other than the vinyl ester, the acrylic ester and the methacrylic ester.

A copolymer of a vinyl ester and at least one of an acrylic ester and a methacrylic ester can be polymerized by means of, for example, a suspension polymerization method in which monomers are polymerized in a suspension state in an aqueous solution along with a polymerization catalyst and a dispersant. The examples of the polymerization catalyst can include an organic peroxide such as benzoyl peroxide, lauryl peroxide; and an azo compound such as azobisisobutyronitrile and azobisdimethylvaleronitrile, etc. Also, the examples of the dispersant to be used for carrying out a suspension polymerization can include a water-soluble polymer [polyvinyl alcohol, poly(meth)acrylic acid or a salt thereof, polyvinylpyrrolidone, methylcellulose, carboxymethylcellulose, hydroxyethyl cellulose, and hydroxypropyl cellulose, etc.], and an inorganic compound (calcium phosphate, and magnesium silicate, etc.).

It is possible to adopt a temperature to perform a suspension polymerization within a range of about +20° C. to −20° C. of the 10 hour half-life temperature of the polymerization catalyst, and a polymerization time within a range of several hours to several tens hours.

Saponification of the copolymer of a vinyl ester and at least one of an acrylic ester and a methacrylic ester can be performed by using an alkali including an alkali metal (sodium hydroxide, potassium hydroxide and lithium hydroxide, etc.) in a mixture solvent of an aqueous organic solvent and water. As a result of the saponification, the unit derived from a vinyl ester can become a unit in which the main chain of the copolymer is directly connected to hydroxyl group [namely, the unit represented by the formula (1)]; and the unit derived from at least one monomer of acrylic ester and methacrylic ester can become a unit in which the main chain of the copolymer is directly connected to an alkali metal salt (group) of carboxyl group [namely, the unit represented by the formula (2)]. Therefore, M' in the formula (2) can represent sodium, potassium and lithium, etc.

The examples of an aqueous organic solvent to be used for the saponification can include a lower alcohol (methanol and ethanol, etc.), and ketones (acetone and methyl ethyl ketone, etc.). It is preferable that a use ratio of the aqueous organic solvent and water is 3/7 to 8/2 at a mass ratio.

It is possible to adopt a temperature during the saponification at 20 to 60° C., and a period for around several hours during it.

The copolymer after the saponification can be taken out from the reaction liquid, washed and dried.

The unit represented by the formula (1) in the copolymer (A) prepared after the saponification has such a structure that the unsaturated bond of the vinyl alcohol is opened for polymerization; and the unit represented by the formula (2) has such a structure that the unsaturated bond of an acrylate or a methacrylate [these in combination are hereinafter referred to as "(meth)acrylate"; and an acrylic acid and a methacrylic acid in combination are referred to as "(meth)acrylic acid"] is opened for polymerization. Therefore, the copolymer (A) sometimes can be referred to as a "copolymer of vinyl alcohol and (meth)acrylate [an alkali metal neutralized product of a (meth)acrylate]" for convenience, even if the copolymer (A) is not a copolymer obtained by polymerizing vinyl alcohol or (meth)acrylate as monomers.

In the copolymer (A), the composition ratio of the unit represented by the formula (1) and the unit represented by the formula (2) can be as follows. Assume that the total of these units is 100 mol %. It is preferable that a ratio of the unit represented by the formula (1) is 5 mol % or more, and more preferably 50 mol % or more, and yet more preferably 60 mol % or more. Also, it is preferably 95 mol % or less, and more preferably 90 mol % or less. Namely, assuming that the total of the unit represented by the formula (1) and the unit represented by the formula (2) is 100 mol %, a ratio of the unit represented by the formula (2) is preferably 5 mol % or more, and more preferably 10 mol % or more. It is also preferably 95 mol % or less, and more preferably 50 mol % or less, and yet more preferably 40 mol % or less.

It is preferable that a content of the copolymer (A) in the negative electrode composition layer is 2 mass % or more, and it is more preferable 5 mass % or more in view of well securing effects therefrom (an effect to improve a load characteristic of a battery, and an effect to restrict a negative electrode active material from falling off or restrict a negative electrode composition layer from a current collector). However, when an amount of the copolymer (A) in a negative electrode composition layer is excessive, it becomes difficult to adjust a density of the negative electrode composition layer within the value as described later, or it could be possible that a capacity and a load characteristic of the battery might decrease. Thus, it is more preferable that a content of the copolymer (A) in a negative electrode composition layer is 15 mass % or less, and more preferably 10 mass % or less.

In the negative electrode composition layer, in addition to the copolymer (A), it is possible to further use a binder such as SBR, CMC and polyvinylidene fluoride (PVDF), which is used in a negative electrode composition layer of a negative electrode of general lithium ion secondary batteries. However, it is preferable that a content of the binder except for the copolymer (A) in the whole amount of the binder included in the negative electrode composition layer is 50 mass % or less.

The negative electrode composition layer can include a conductive assistant, if necessary. Favorable examples of the conductive assistant in negative electrode composition layer can include carbon material Such as carbon black such as acetylene black, Ketjen black, channel black, furnace black, lamp black, and thermal black; and carbon fibers. Also, it is possible to use conductive fibers such as metal fibers; fluorinated carbon; metallic powder such as aluminum; zinc oxide; conductive whiskers such as potassium titanate; conductive metal oxides such as titanium oxide; and organic conductive material Such as polyphenylene derivatives, etc. As a conductive assistant, it is possible that one exemplified above can be used alone or in combination thereof.

When a conductive assistant is included in the negative electrode composition layer, a content of the conductive assistant can be favorably to satisfy 10 mass % or less.

The negative electrode can be prepared as follows. For example, a negative electrode composition including a negative electrode active material and a binder, as well as a conductive assistant if necessary, is dispersed into a solvent such as N-methyl-2-pyrrolidone (NMP) or water, etc. to prepare a composition containing the negative electrode composition in a past or slurry state (it is noted that the binder may be dissolved in the solvent), which is then applied to one surface or both surfaces of a current collector. After drying, a press process such as a calendar process is applied if necessary, so as to prepare a negative electrode. However, the manufacturing method of a negative electrode is not limited thereto, and the other methods can be adopted.

As a current collector of the negative electrode, the examples thereof can include a metal foil such as a foil made of copper or nickel, but it is generally to use a copper foil. When this negative electrode current collector is configured to reduce the thickness of the whole negative electrode in order to obtain a battery of a high energy density, it is preferable that the upper limit of the thickness is 30 μm. It is also desirable that the lower limit is 5 μm in view of securing a mechanical strength.

Also, the negative electrode can be provided with a lead body for connecting it to the other members inside the lithium secondary battery electrically, if necessary, which can be attached by a known method.

It is favorable that a thickness of the negative electrode composition layer (when a negative electrode composition layer is provided on both surfaces of a current collector, the thickness here is on one surface) is 10 to 100 μm per one side of the current collector.

In addition, in the negative electrode, it is preferable that at least a part of the negative electrode active material (in particular, material S) contained in the negative electrode composition layer has doped with Li ions.

In case of an electrochemical element which has prepared by using a high-capacity negative electrode material such as material S, even if Li released from the positive electrode is incorporated into the high-capacity negative electrode material, a ratio of staying there without being released again at the next discharge becomes generally high. Therefore, a capacity of electrochemical element originally provided with cannot be fully used. However, when doping (pre-doping) Li ions in the negative electrode active material in advance, a ratio of Li which moves between the positive electrode and the negative electrode in charge and discharge can be increased, thereby reducing an irreversibility capacity of the electrochemical element so as to accomplish a higher capacity of an electrochemical element.

In order to dope Li ions in the negative electrode active material, it is possible to adopt a method to perform it inside an electrochemical element such as a lithium ion secondary battery (internal system pre-dope). However, in order to dope Li ions in a negative electrode active material of a negative electrode before it is incorporated in an electrochemical element such as a lithium ion secondary battery, it is also possible to adopt for example, an external system pre-dope method (i) or (ii) as explained below.

External System Pre-Dope Method (i)

A negative electrode prepared by using a negative electrode active material which has not been doped with Li ions is used, and the negative electrode active material is doped with Li ions.

In the external system pre-dope method (i), a negative electrode active material in a negative electrode composition layer of a negative electrode can be doped with Li ions as follow. For example, a biphenyl, a polycyclic aromatic compound (anthracene, naphthalene, etc.), p-benzoquinone or Li metal is dissolved in a solvent such as tetrahydrofuran or diethyl ether, into which solution the negative electrode is immersed, followed by washed with a solvent and dried (which is hereinafter referred to as external system pre-dope method (i-1)). The dope amount of Li ions in this case can be controlled by adjusting a content of each component in the solution. For example, it can be adjusted to satisfy a molar ratio Li/M into the favorable range as described later.

In addition, in case of the external system pre-dope method (i), another method is as follow: A negative electrode (i.e., action pole) and a lithium metal foil (i.e., counter pole; which can include a lithium alloy foil) are immersed in a nonaqueous electrolyte liquid, and electric current is applied therebetween. As a result, Li ions can be doped in the negative electrode active material of the negative electrode composition layer (which is hereinafter referred to as external system pre-dope method (i-2). The same nonaqueous electrolyte liquid can be used as a nonaqueous electrolyte liquid (which will be described later in detail) of a lithium ion secondary battery. A dope amount of Li ions in this case can be controlled by adjusting a current density per area of the negative electrode (negative electrode composition layer) or a current amount of electricity current applied therebetween. For example, it can be adjusted to satisfy a molar ratio Li/M into the favorable range as described later.

External System Pre-Dope Method (ii)

Li ions are doped directly in a negative electrode active material which has not yet been doped with Li ions. In this case, into the solution for immersing a negative electrode as explained for the external system pre-dope method (i-1), not a negative electrode but a negative electrode active material (a negative electrode active material before Li ions are doped) is immersed, thereby doping Li ions into the negative electrode active material.

When adopting the external system pre-dope method (ii), a negative electrode active material obtained by this method (a negative electrode active material having doped with Li ions) can be used to prepare a negative electrode in accordance with the method as explained before, so as to obtain a negative electrode including a negative electrode active material having doped with Li ions. Also in this case, a part or the whole of the negative electrode active material to be used for producing a negative electrode can be one in which Li ions have been doped by means of the external system pre-dope method (ii). A ratio of the negative electrode active material having doped with Li ions by means of the external system pre-dope method (ii) in the negative electrode active material used for producing a negative electrode, or a dope amount of Li ions in the negative electrode active material can be adjusted in order to satisfy a molar ratio Li/M as explained later within the favorable range as explained later.

It is desirable that the negative electrode active material to be doped with Li ions by means of the external system pre-dope method (ii) has a large acceptance amount of Li ions and a large irreversibility capacity. Also, it is preferable that Li ions are doped in the material S (in particular, $SiO_x$ as explained before).

The negative electrode of the present invention can be used as a negative electrode of an electrochemical element such as a lithium ion secondary battery or a super capacitor, which includes a nonaqueous electrolyte liquid and is subject to repeated operations of charge and discharge. In particular, its main application is a lithium ion secondary battery.

A lithium ion secondary battery (lithium ion secondary battery of the present invention) using the negative electrode of the present invention includes the negative electrode, a positive electrode, a separator and a nonaqueous electrolyte liquid.

The positive electrode of a lithium ion secondary battery has a positive electrode composition layer including a positive electrode active material and a binder. For example, it has a structure in which such a positive electrode composition layer is formed on one surface or both surfaces of a current collector, or one constituted by a positive electrode composition layer (a positive electrode composition molded body).

As a positive electrode active material, a metal oxide (i.e., a lithium-containing composite oxide) made of Li and a metal M other than Li(Co, Ni, Mn, Fe, Mg, Al, etc.). The examples of such a lithium-containing composite oxide can include lithium cobalt oxide such as $LiCoO_2$; lithium manganese oxides such as $LiMnO_2$, and $Li_2MnO_3$; lithium nickel oxides such as $LiNiO_2$; lithium-containing complex oxides having a layer structure such as $LiCo_{1-x}NiO_2$; lithium-containing complex oxides having a spinel structure such as $LiMn_2O_4$, and $Li_{4/3}Ti_{5/3}O_4$; lithium-containing complex oxides having an olivine structure such as $LiFePO_4$; and oxides in which the basic compositions of the oxides as identified above are included with replacement of various elements.

Among such positive electrode active materials, it is preferable to use a lithium cobalt oxide (lithium cobalt oxide) including Co and at least one kind of element $M^1$ selected from the group consisting of Mg, Zr, Ni, Mn, Ti and Al. Also, it is more preferable that the positive electrode composition layer includes a positive electrode material in which surfaces of the particles of such a lithium cobalt oxide are coated with an Al-containing oxide. When using the positive electrode material as explained above, a resistance of the positive electrode at the time of charge of the battery can be increased. As a result, it becomes difficult to bring about a deposition of Li on the negative electrode. Therefore, even if increasing a ratio of the material S in the negative electrode composition layer, it becomes possible to further improve the charge discharge cycle characteristic of the lithium ion secondary battery.

The lithium cobalt oxide can be represented by a composition formula $LiM^aO_2$. Here, $M^a$ represents an element group including Co, at least one kind of element $M^1$ selected from the group consisting of Mg, Zr, Ni, Mn, Ti and Al, and additional element that can be further included.

In the lithium cobalt oxide, the element $M^1$ can improve a stability at a high voltage region of the lithium cobalt oxide, and bring about an action to restrict Co ions from elution while acting to improve a heat stability of the lithium cobalt oxide.

In the lithium cobalt oxide, in view of more effectively obtaining the actions above, a quantity of the element $M^1$ with respect to Co, that is, an atom ratio $M^1/Co$ can preferably satisfy 0.003 or more, and more preferably it can satisfy 0.008 or more.

However, when a quantity of the element $M^1$ in the lithium cobalt oxide is excessive, a quantity of Co can become too little, and it might become uncertain whether to secure the actions from it. Thus, regarding the quantity of the element $M^1$ in the lithium cobalt oxide, it is preferable that $M^1$/Co, that is an atom ratio with respect to Co, satisfies 0.06 or less, and yet more preferable that it satisfies 0.03 or less.

In the lithium cobalt oxide, Zr acts to adsorb hydrogen fluoride, which could be generated from a fluorine-containing lithium salt ($LiPF_6$ and etc.) included in the nonaqueous electrolyte liquid, and therefore, it can restrict deterioration of the lithium cobalt oxide.

When a small amount of water is inevitably contaminated in the nonaqueous electrolyte liquid used in a lithium ion secondary battery, or when the other battery materials are at a state where water is adsorbed to, hydrogen fluoride can be generated through a reaction with a fluorine-containing lithium salt which is included in the nonaqueous electrolyte liquid. When hydrogen fluoride is generated inside the battery, its action can bring about deterioration of the positive electrode active material.

However, when a lithium cobalt oxide is synthesized in such a way to further include Zr, then a Zr oxide can be deposited on the surfaces of the particles, thereby adsorbing hydrogen fluoride by the Zr oxide. As a result, the deterioration of the lithium cobalt oxide due to the generation of hydrogen fluoride can be restricted.

In addition, a load characteristic of a battery can be improved when Zr is included in the positive electrode active material. It can be possible to use a lithium cobalt oxide included in the positive electrode material, which comprises two materials different in the average particle diameter from each other. Assume that the one having a larger average particle diameter as being a lithium cobalt oxide (A); and that the other having a smaller average particle diameter as being a lithium cobalt oxide (B). Generally speaking, when using a positive electrode active material having a large particle diameter, it can tend to reduce a load characteristic of a battery. Therefore, in a positive electrode active material constituting the positive electrode material, it is preferable to include Zr in the lithium cobalt oxide (A) having a larger average particle diameter. On the other hand, the lithium cobalt oxide (B) may or may not include Zr therein.

In the lithium cobalt oxide, a quantity of the element Zr with respect to Co, that is, an atom ratio Zr/Co can preferably satisfy 0.0002 or more, and more preferably it can satisfy 0.0003 or more in view of more favorably obtaining the actions above. However, when the quantity of Zr in the lithium cobalt oxide is excessive, the quantity of the other elements can become too little and it might become uncertain if the actions from them can be secured. Therefore, regarding the quantity of the element Zr with respect to Co in the lithium cobalt oxide, an atom ratio Zr/Co can preferably satisfy 0.005 or less, and more preferably, it can satisfy 0.001 or less.

The lithium cobalt oxide can be prepared by mixing a compound containing an element $M^1$ (oxide, hydroxide and sulfate, etc.) such as a Li-containing compound (lithium hydroxide and lithium carbonate, etc.), a Co-containing compound (cobalt oxide and cobalt sulfate, etc.), a Mg-containing compound (magnesium sulfate, etc.) and a Zr-containing compound (zirconium oxide, etc.) to obtain a raw material mixture thereof, followed by burning it to be synthesized. In addition, in order to synthesize a lithium cobalt oxide with a higher purity, it is preferable that a complex compound containing Co and the element $M^1$ (hydroxides and oxides, etc.) is mixed with e.g., a Li-containing compound, thereby obtaining a raw material mixture, followed by burning it.

A burning condition of the raw material mixture to synthesize the lithium cobalt oxide can be, for example, at 800 to 1050° C. for 1 to 24 hours. However, it is preferable that at a first stage it is heated to a temperature that is lower than the burning temperature (e.g., 250 to 850° C.) and kept at the temperature to carry out a preliminary heating, and then, followed by raising it to the burning temperature to make the reaction progress. A period to continue the preliminary heating is not particularly limited, but it can be generally carried out for 0.5 to 30 hours. Also, the atmosphere under the burning can be an atmosphere including oxygen (namely, in the atmosphere), a mixed atmosphere of an inert gas (argon, helium, nitrogen, etc.) and an oxygen gas, or an oxygen gas atmosphere. In this case, it is preferable that the oxygen concentration can be 15% or more (volume standard), and it is more preferable that it can be 18% or more.

In the positive electrode material, the surfaces of the particles of the lithium cobalt oxide are coated with an Al-containing oxide (for example, there exists an Al-containing oxide at 90 to 100% of all the area of the surfaces of the particles of the lithium cobalt oxide). The examples of the Al-containing oxide with which the surface of the particles of the lithium cobalt oxide is coated can include $Al_2O_3$, AlOOH, $LiAlO_2$, $LiCo_{1-w}Al_wO_2$ (wherein $0.5<w<1$), and one kind of these can be used alone, or two or more kinds can be used in combination. In addition, when the surfaces of the lithium cobalt oxide are coated with $Al_2O_3$ by means of the method explained later, the coating film thus formed can be of $Al_2O_3$ which can partly include an Al-containing oxide containing an element such as Co and Li as a result of moving from the lithium cobalt oxide. Therefore, such a coated film can be within the scope of the coating film including an Al-containing oxide to cover the surfaces of the lithium cobalt oxide to constitute the positive electrode material.

An average coating thickness of an Al-containing oxide in the particles constituting the positive electrode material can be defined in view of the two aspects below: one is to increase a resistance by the action of the Al-containing oxide that can obstruct the lithium ions from being inserted in or released from the positive electrode active material of the positive electrode material during charge and discharge of the battery, thereby improving a charge discharge cycle characteristics of the battery by restricting the Li deposition at the negative electrode; and the other is to favorably control the reaction of the positive electrode active material in the positive electrode material with the nonaqueous electrolyte liquid. In view of the aspects above, it is preferable to satisfy 5 nm or more, and more preferably to satisfy 15 nm or more. In addition, an average coating thickness of the Al-containing oxide can be defined in view of restricting the deterioration of the load characteristics of the battery by the action of the Al-containing oxide which can obstruct the lithium ions from being inserted into and released from the positive electrode active material in charging and discharging the battery. In view of the above, the average coating thickness of the Al-containing oxide in the particles constituting the positive electrode material can be preferably to satisfy 50 nm or less, and more preferably to satisfy 35 nm or less.

In the specification of the present application, the feature that "the average coating thickness of an Al-containing oxide in the particles" can be measured as follows. That is, a cross section of the positive electrode material obtained by the process of a convergence ion beam method is magnified 400,000 times by using a transmission electron microscope, to thereby observe the positive electrode material particles within a field of vision of 500×500 nm. The same measurement is carried out at ten fields of vision that are arbitrarily selected. In each field of vision, ten places are arbitrarily selected to measure each of the thicknesses of the coating film of the Al-containing oxide, each having a cross section that is equal or less than the average particle diameter $(d_{50})\pm5$ μm, and a thickness of the coating film of the Al-containing oxide is measured for ten times within the each field of vision. Then, the thickness of the coating film of the Al-containing oxide is obtained as an average (an averaged number) of the values obtained by measuring the thicknesses at the whole fields of visions (i.e., the thickness at 100 places).

Regarding the specific surface area of the positive electrode material, it is preferable to satisfy 0.1 $m^2/g$ or more, and more preferable to satisfy 0.2 $m^2/g$ or more. It is also preferable to satisfy 0.4 $m^2/g$ or less, and more preferable to satisfy 0.3 $m^2/g$ or less. When a specific surface area of the positive electrode material satisfies the value as mentioned above, a resistance during charge and discharge of a battery can be increased so that a charge discharge cycle characteristics of the battery can be improved more favorably.

In addition, when the surfaces of the particles of the lithium cobalt oxide constituting the positive electrode material are coated with an Al-containing oxide, or when it is constituted to make a Zr oxide deposition on the surfaces of the particles of the lithium cobalt oxide, the surfaces of the positive electrode material can be usually made coarse, thereby increasing a specific surface area. Therefore, in addition to making the positive electrode material have a relatively large particle size, when a good property is given to the coating film of the Al-containing oxide with which the surfaces of the particles of the lithium cobalt oxide are coated, the specific surface area being small as mentioned above can be obtained easily, and therefore it is considered to become preferable.

The lithium cobalt oxide included in the positive electrode material can be made of one kind, or two kinds of materials, each having a different average particle diameter from each other as described above. In addition, it can be made of three or more kinds of materials, each having a different average particle diameter to each other.

In order to adjust the positive electrode material to satisfy the value of the specific surface area as mentioned above, it is preferable that when it is made of one kind of lithium cobalt oxide, the positive electrode material has an average particle diameter of 10 to 35 μm.

When the lithium cobalt oxide included in the positive electrode material includes two kinds of material, each different in the average particle diameter from each other, it is preferable to include at least a positive electrode material (a) and a positive electrode material (b); the positive electrode material (a) including particles of the lithium cobalt oxide (A) whose surfaces are coated with an Al-containing oxide and has an average particle diameter of 1 to 40 μm; the positive electrode material (b) including particles of the lithium cobalt oxide (B) whose surfaces are coated with an Al-containing oxide and has an average particle diameter is 1 to 40 μm, in which an average particle diameter of the positive electrode material (b) is smaller than that of the positive electrode material (a). It is furthermore preferable to be made of larger particles having an average particle diameter of 24 to 30 μm [positive electrode material (a)], and smaller particles having an average particle diameter of 4 to 8 μm [positive electrode material (b)]. In addition, when the positive electrode material includes the positive electrode material (a) and the positive electrode material (b), it is preferable that the ratio of the positive electrode material (a) in all the positive electrode material is 75 to 90 mass %. Not only a specific surface area can be adjusted in this way, but also the positive electrode material having a smaller particle diameter can enter the gap of the positive electrode material having a larger particle diameter through the press work process of the positive electrode composition layer. As a result, a stress applied to the positive electrode composition layer can be entirely spread out, and therefore the particles of the positive electrode material can be favorably restricted from cracking, thereby favorably bringing about an action from forming the coating film of the Al-containing oxide.

A particle size distribution of the positive electrode material in the specification of the present application means a particle size distribution measured by using a micro track particle size distribution measuring equipment "HRA9320" manufactured by Nikkiso Co., Ltd., followed by obtaining an integral calculus volume from small particles of the particle size distribution. Also, regarding the positive electrode material and the other particles (material S, etc.) in the specification of the present application, the average particle diameter means, by using the device as mentioned above, a value $(d_{50})$ of the 50% diameter in the multiplication fraction of the volume standard in case of obtaining the particle size distribution by integral calculus volume from the small particles.

In order to prepare a positive electrode material by coating the surface of the particles of the lithium cobalt oxide with an Al-containing oxide, for example, the following method can be adopted: Into a lithium hydroxide aqueous solution at a pH of 9 to 11 and at a temperature of 60 to 80° C., lithium cobalt oxide is put to be dispersed by stirring, into which $Al(NO_3)_3 \cdot 9H_2O$ and an ammonium solution to suppress a pH fluctuation are dropped, to produce an $Al(OH)_3$ coprecipitation matter, thereby adhering it on the surface of the lithium cobalt oxide. Then, the particles of the positive electrode active material on which $Al(OH)_3$ coprecipitation matter is adhered are taken out from the reaction liquid, followed by washing, drying and applying a heat treatment, thereby forming a coating film of the Al-containing oxide on the surfaces of the particles of the lithium cobalt oxide, to obtain a positive electrode material. It is preferable that a heat treatment of the particles of the lithium cobalt oxide on which $Al(OH)_3$ coprecipitation matter is adhered is carried out in the atmosphere at a heat treatment temperature of 200 to 800° C., and for a heat treatment period of 5 to 15 hours. When the surfaces of the particles of the lithium cobalt oxide are coated with the Al-containing oxide by the method above, adjustment of a heat treatment temperature as mentioned above can change the Al-containing oxide, i.e., the main component to constitute the coating film, into $Al_2O_3$, AlOOH, $LiAlO_2$, or $LiCo_{1-w}Al_wO_2$ (note $0.5<w<1$).

When an additional positive electrode active material is used along with the positive electrode material as mentioned above, it is considered to improve the continuous charge properties of the battery without deteriorating a charge discharge cycle characteristics and a storage property under a high temperature of the lithium ion secondary battery. Therefore, the examples of such an additional positive electrode active material can include a lithium nickel oxide including Ni, Co, and an element $M^2$ selected from the group consisting of Mg, Mn, Ba, W, Ti, Zr, Mo and Al.

The lithium nickel oxide can be expressed by a chemical formula $LiM^bO_2$. Here, an element group $M^b$ represents a group including Ni, Co, the element $M^2$, and any additional optional elements that can be further included. When each of the quantities of Ni, Co and the element $M^2$ in all the atoms, i.e., 100 mol %, of the element group $M^2$ is s (mol %), t (mol %) and u (mol %), it is preferable to satisfy 30≤s≤97, 0.5≤t≤40, 0.5≤u≤40. It is more preferable to satisfy 70≤s≤97, 0.5≤t≤30, 0.5≤u≤5.

The lithium nickel oxide can be prepared by mixing a Li-containing compound (lithium hydroxide, and lithium carbonate, etc.), a Ni-containing compound (nickel sulfate, etc.), a Co-containing compound (cobalt sulfate and cobalt oxide, etc.), and a compound containing an element $M^b$ (oxide, hydroxide and sulfate, etc.) to obtain a raw material mixture, followed by burning it to be synthesized. In addition, in order to synthesize a lithium nickel oxide with a higher purity, a complex compound (hydroxide and oxide, etc.) including several elements among Ni, Co and the element $M^b$, that is, an optional element if necessary, is mixed with another raw compound (Li-containing compound, etc.), to obtain a raw material mixture, followed by burning it to be synthesized.

In the same manner as synthesizing the lithium cobalt oxide, a burning condition of the raw material mixture to synthesize the lithium nickel oxide can be, for example, at 800 to 1050° C. for 1 to 24 hours. It is preferable that at the first stage it is heated to a temperature that is lower than the burning temperature (e.g., 250 to 850° C.) and kept at the temperature to carry out a preliminary hearing, followed by raising it to the burning temperature to progress the reaction. A period to continue the preliminary heating is not particularly limited, but it can be generally carried out for 0.5 to 30 hours. Also, the atmosphere under the burning can be an atmosphere including oxygen (namely, in the atmosphere), a mixed atmosphere of an inert gas (argon, helium, nitrogen, etc.) and an oxygen gas, or an oxygen gas atmosphere. In this case, it is preferable that the oxygen concentration can be 15% or more (volume standard), and it is more preferable that it can be 18% or more.

When the positive electrode material and additional positive electrode active material (e.g., lithium nickel oxide) are used as a positive electrode active material, it is preferable that a quantity of the positive electrode material is 50 mass % or more in 100 mass % in total of the positive electrode material and said additional positive electrode active material. It is more preferably to satisfy 80 mass % or more (namely, it is preferable that the quantity of said additional positive electrode active material is 50 mass % or less in 100 mass % in total of the positive electrode material and said additional positive electrode active material; and it is more preferable to satisfy 20 mass % or less). In addition, the positive electrode material alone can be used as a positive electrode active material. In this case, favorable upper limit of the quantity of the positive electrode material in 100 mass % in total of the positive electrode material and said additional positive electrode active material can be 100 mass %. However, in order to favorably secure the improvement effects on the continuous charge properties of the battery by using the lithium nickel oxide, it is preferable that a quantity of the lithium nickel oxide satisfy 5 mass % or more in 100 mass % in total of the positive electrode material and the lithium nickel oxide, and it is more preferable to satisfy 10 mass % or more.

The examples of the conductive assistant in the positive electrode active material can include a carbon material including graphites (graphite state carbon material) such as natural graphite (scale-like graphite, and etc.) and artificial graphite; carbon black such as acetylene black, Ketjen black, channel black, furnace black, lamp black, and thermal black; and carbon fibers. In addition, favorable examples used as a binder of the positive electrode composition layer can include PVDF, polytetrafluoroethylene (PTFE), polyvinylidene fluoride-chlorotrifluoroethylene copolymer [P(VDF-CTFE)], SBR, CMC, and etc.

The positive electrode can be prepared as follows. For example, a positive electrode active material (a positive electrode material, etc.), a conductive assistant, a binder and etc. are dispersed in a solvent such as NMP to prepare a composition containing a positive electrode composition in a paste or slurry state (here, the binder may be dissolved in the solvent), which is then applied on one surface or both surfaces of a current collector, and dried, followed by applying a calendar process, if necessary.

It is noted that the manufacturing method of the positive electrode is not limited thereto, and other methods can be used. For example, in case where the positive electrode is prepared as a pellet form of a positive electrode composition molded body, a positive electrode composition including a positive electrode active material, a conductive assistant and a binder, etc. is subject to a press work process to make it into a pellet form, thereby preparing a positive electrode.

As a current collector, the material Similar to those which have been conventionally used in the positive electrode of the lithium ion secondary batteries can be used. The examples thereof can include an aluminum foil, punched metal, mesh, expanded metal, and etc., and it is preferable that the thickness is 5 to 30 μm.

In the composition of the positive electrode composition layer or the positive electrode composition molded body, it is favorable that a quantity of the positive electrode active material (including the positive electrode material as mentioned before) is 60 to 95 mass %, that the quantity of the binder is 1 to 15 mass %, and that the quantity of the conductive assistant is 3 to 20 mass %. In addition, in case where an embodiment of a positive electrode including a positive electrode composition layer and a current collector is adopted, it is preferable that a thickness (a thickness per one side of the current collector) of the positive electrode composition layer is 30 to 150 μm. On the other hand, if a positive electrode is constituted from a positive electrode composition molded body, it is preferable that the thickness is 0.15 to 1 mm.

In a lithium ion secondary battery, it is possible to use a stacked body (stacked electrode body) including a negative electrode and a positive electrode with intervention of a separator therebetween, or to use a winding body (winding electrode body) obtained by winding the stacked body into an eddy form.

A separator is preferably a porous film made of, for example, a polyolefin such as polyethylene, polypropylene and ethylene-propylene copolymer; or a polyester such as polyethylene terephthalate and copolymerized polyester. In addition, it is preferable that the separator can be provided with a property that is able to close its pores at 100 to 140° C. (i.e., shutdown function). For this purpose, the separator preferably includes a thermoplastic resin having a melting temperature of 100 to 140° C. as its component. In this case, the melting temperature can be measured by means of a differential scanning calorimeter (DSC) in accordance with Japanese Industrial Standards JIS K 7121. The separator is preferably of a single-layer porous film made of polyethylene as a main component, or a laminated porous film made of two to five layers of polyethylene and polypropylene.

When mixing polyethylene with, or laminating polyethylene on, a resin such as polypropylene having a higher melting point than polyethylene, it is preferable that polyethylene as a resin to constitute the porous film can be included at 30 mass % or more, and more desirably at 50 mass % or more.

For such a resin porous film, it is possible to use, for example, a porous film which is made of any of thermoplastic resins mentioned above and is used in conventionally-known lithium ion secondary batteries and the like, that is, an ion-permeable porous film produced by solvent extraction, dry drawing, wet drawing, or the like.

Regarding the average particle diameter of a separator, it is preferable to satisfy 0.01 μm or more, and more preferably to satisfy 0.05 μm or more, but preferably to satisfy 1 μm or less, and more preferably to satisfy 0.5 μm or less.

The separator to be used can be of a laminate type separator having a porous film (I) mainly composed of a thermoplastic resin, and a porous layer (II) mainly composed of fillers having a heat resistant temperature of 150° C. or more. The separator is provided with properties of a shutdown function, a heat resistance (heat resistant shrinkage property) and a high mechanical strength. In addition, by using a laminate type separator, a charge and discharge cycle characteristics of a battery can be further improved. The reason thereof has not yet been confirmed, but it is presumed that because a laminate type separator has a high mechanical strength to provide with a high resistance against the expansion or shrinkage of the negative electrode caused by charge and discharge cycle of a battery, and therefore, the separator can be restricted from being twisted, thereby maintaining a coherency among the negative electrode, the separator and the positive electrode.

In the specification of the present application, a feature "heat-resistant temperature of 150° C. or more" means that a transformation such as softening does not start at least at a temperature of 150° C.

The porous film (I) included in the separator is a layer to be provided to mainly ensure the shutdown function, and therefore, if the battery reaches the melting point of the resin, i.e., the main component of the porous film (I), the resin contained in the porous film (I) may melt to close the pores of the separator, thereby causing a shutdown effect that suppresses the progress of the electrochemical reaction.

The examples of the resin having a melting point of 140° C. or less used as a main component of the porous film (I) can include, for example, polyethylene. The embodiments of the porous film (I) can include a microporous film that is usually used as a separator of a battery, and a sheet obtained by applying a dispersion containing polyethylene particles on a substrate such as a non-woven fabric, followed by drying. Here, in the total of the constituent components of the porous film (I) (here, it is the total volume excluding the cavity portions; and the same explanation applies to a content ratio by volume of the components of the porous film (I) and the porous layer (II)), it is preferable that the content ratio by volume of the main resin having a melting point of 140° C. or less is 50 vol % or more, and more preferably 70 vol % or more. When forming a porous film (I) from the microporous film of polyethylene mentioned above, a volume of the resin having a melting point of 140° C. or less is 100 vol %.

The porous layer (II) included in the separator is provided with a function to prevent a short circuit caused by direct contact between the positive electrode and the negative electrode, even if an internal temperature of the battery is raised, and this function is secured by fillers having a heat resistance temperature of 150° C. or more. In other words, if a battery is raised to a high temperature and the porous film (I) is shrunk, the porous layer (II) that is less likely to be susceptible to shrinkage can prevent a short circuit caused by direct contact between the positive electrode and the negative electrode though it could occur if a separator is thermally shrunk. Also, the heat resistant porous layer (II) acts as a framework of the separator, and therefore it is possible to restrict a thermal shrinkage of the porous film (I), and eventually, it is also possible to restrict the overall thermal shrinkage of the separator.

The fillers of the porous layer (II) can be either of organic particles or inorganic particles, so long as they have a heat resistant temperature of 150° C. or more and are stable in the electrolyte liquid included in a battery, and furthermore are electrochemically stable to be difficult to cause a redox reaction within the range of a battery operation voltage. It is preferable that they are of fine particles in view of dispersibility, and that they are made of inorganic oxide particles, more in details, made of alumina, silica or boehmite. Alumina, silica and boehmite have a high resistance to oxidation and can adjust particle sizes and shapes thereof within ranges of desired numerical values. Therefore, a cavity rate of the porous layer (II) can be precisely controlled. The fillers having a heat resistant temperature of 150° C. or more can be used alone or in combination of two or more kinds.

In this specification, the phrase "mainly composed of filler having a heat resistant temperature of 150° C. or more" regarding the porous layer (II) means a state in which the fillers as explained before are included at 70 volume % or more in the total volume of the components of the porous layer (II). The quantity of the fillers in the porous layer (II) is preferably 80 volume % or more, and more preferably 90 volume % or more in the total volume of the components of the porous layer (II). When the fillers are included in the porous layer (II) at a high content as explained above, thermal contraction of the separator as a whole can be favorably controlled, thereby giving a heat resistance being high.

In addition, it is preferable that the porous layer (II) includes an organic binder in order to adhere to the fillers each other, or between the porous layer (II) and the porous film (I). In view of the above, the upper limit of the quantity of the fillers (B) in the porous layer (II) is suitably 99 volume % in total volume of the components of the porous layer (II). Also, when the quantity of the fillers (B) in the porous layer (II) is less than 70 volume %, for example, it is necessary to increase the quantity of the organic binder in the porous layer (II). In such a case, the pores of the porous layer (II) could be filled out with the organic binder, which might lose a function as a separator.

The organic binder used for the porous layer (II) is not particularly limited, if it can favorably adhere to the fillers each other as well as between the porous layer (II) and the porous film (I), and if it is electrochemically stable as well as stable to the nonaqueous electrolyte liquid of the electrochemical element. The examples thereof can include fluororesin (PVDF, etc.), fluorine-type rubber, SBR, CMC, hydroxyethyl cellulose (HEC), polyvinyl alcohol (PVA), polyvinyl butyral (PVB), polyvinylpyrrolidone (PVP), poly-N-vinyl acetamide, crosslinked acrylic resin, polyurethane and epoxy resin, etc. These examples of the organic binder can be used alone or in combination of two or more kinds thereof.

For example, the laminate type separator as explained above can be prepared as follows: A composition (in a slurry, paste or the like) for forming a porous layer (II) including the fillers, an organic binder and a solvent (water, and an organic solvent such as ketones or the like) is applied on a porous film (I), followed by drying it at a defined temperature, thereby forming a porous layer (II).

The laminate type separator can include single layer of a porous film (I) and single layer of a porous layer (II), or plurality layers of them. In details, only one surface of the porous film (I) can be provided with the porous layer (II) to form the laminate type separator. Alternatively, both surfaces of the porous film (I) can be provided with the porous layer (II) to form the laminate type separator. However, if number of layers to constitute the laminate type separator is increased, a thickness of the separator will increase, which might unfavorably bring about increase of the internal resistance of the electrochemical element or decrease of the energy density. Therefore, it is preferable that number of layers to constitute the laminate type separator is five layers or less.

Regarding the thickness of the separator (the laminate type separator or any other separators), it is preferable to satisfy 6 μm or more, and more preferably to satisfy 10 μm or more, in view of securing the separation between the positive electrode and the negative electrode. On the other hand, when a thickness of the separator becomes excessively large, the energy density of a battery might be decreased. Therefore, the thickness is preferably 50 μm or less, and it is more preferably 30 μm or less.

Also, a thickness of the porous film (I) is preferably 5 to 30 μm (when there exist a plural layers of the porous film (I), the thickness here means a total thickness thereof). Furthermore, the thickness of the porous film (II) is preferably 1 μm or more, and it is more preferably 2 μm or more, and it is yet more preferably 4 μm or more, but it is preferably 20 μm or less, and it is more preferably 10 μm or less, and it is yet more preferably 6 μm or less (when there exist a plural layers of the porous film (II), the thickness here means a total thickness thereof).

Regarding the cavity rate of the separator (the laminate type separator as explained above and any other separators), it is preferable to satisfy 30 to 70%.

In addition, it is preferable that the separator (the laminate type separator as explained above and any other separators) is provided with an adhesive layer on one surface thereof or both surfaces thereof. In forming a stacked electrode body or a winding electrode body if the adhesive layer of the separator can unify an electrode with the separator, a battery using the electrode body thus prepared, even if repeating charge and discharge, can restrain a shape change of the electrode body, thereby further improving the charge discharge cycle characteristic of the battery. In case of a battery using a flat shape winding electrode body which has a cross section being a flat shape, particularly remarkable improvement can be found in the charge discharge cycle characteristic by using the adhesive layer.

It is preferable that the adhesive layer of a separator includes an adhesive resin whose adhesive property can be developed by heating. In case of an adhesive layer including an adhesive resin, the electrode can be unified with the separator through a process (hot press) to press the electrode under heating. The lowest temperature to develop an adhesive property of the adhesive resin is required to be lower than the temperature to develop the shutdown in the layers of the separator other than the adhesive layer. In particular, it is preferably at 60° C. or more, and at 120° C. or less. In addition, when a separator is the laminate type separator as explained above, the lowest temperature to develop an adhesive property of the adhesive resin is required to be lower than the melting point of a thermoplastic resin as a main component of the porous layer (I).

By using such an adhesive resin, it is possible to restrict the separator from deterioration in applying a hot press treatment when unifying the separator with a positive electrode and/or a negative electrode.

Based on the existence of the adhesive resin, there can be the following peel strength between the separator and the electrode constituting electrode body (e.g., negative electrode) if carrying out a peel test at 180°. In a condition before hot-press, it is preferably 0.05 N/20 mm or less, and particularly preferably 0 N/20 mm (a state where no adhesive strength is shown). In a condition after applying hot-press at a temperature of 60 to 120° C., it is preferable to show a delayed tack characteristic of 0.2 N/20 mm or more.

However, when the peel strength is too strong, electrode composition layers (a positive electrode composition layer and a negative electrode composition layer) might be peeled off from the current collector of the electrode, thereby decreasing a conductivity. Therefore, a peel strength at the peel test at 180° is preferably 10 N/20 mm or less in a condition after having applied hot-press at a temperature of 60 to 120° C.

In addition, in this specification, the peel strength at 180° between an electrode and a separator can be the value measured in accordance with method below. Each of a separator and an electrode is cut to have a size of 5 cm in length and 2 cm in width. Thereby obtained cut separator is stacked on the electrode cut. When measuring a peel strength of the condition after hot press, the area of 2 cm×2 cm from one end thereof is subject to hot press to prepare a test sample. With respect to the test sample, the separator and the electrode are opened at the other end where the hot press is not applied, and the separator and the negative electrode are bent to form an angle of 180° therebetween. Then, using a tensile strength test equipment, the test sample in forming the angle of 180° is held by the equipment at the one end of the separator and at the other end of the electrode. The test sample is pulled at a speed of 10 mm/min to measure the strength when the hot-pressed domain of the separator and the electrode is peeled therefrom. Also, the peel strength of the test sample in a condition before applying hot press to the separator and the electrode can be measured in the same manner as explained above, except for the following difference. That is, the cut separator is stacked on the electrode cut as explained above, but then, the press is applied without heating to prepare a test sample.

Therefore, it is preferable that the adhesive resin has little adhesive property (adhesiveness) at room temperature (e.g., at 25° C.) and has a delayed tack property such that the minimum temperature to develop the adhesive property is lower than the temperature that the separator shuts down, and is preferably e.g., at 60° C. or more, and at 120° C. or less. In addition, it is more preferable that a temperature to apply hot press to unify a separator with an electrode is at 80° C. or more, and at 100° C. or less so that the thermal contraction of the separator does not significantly produce. It is also preferable that the minimum temperature when an adhesive property of the adhesive resin to be developed is at 80° C. or more, and at 100° C. or less.

The adhesive resin having a delayed tack property can be preferably a resin having characteristics that it has little fluidity at room temperature but shows a fluidity when heating it to adhere by pressing. In addition, the adhesive resin to be used can be one that is solid at room temperature but melts when heated so as to develop an adhesive property through a chemical reaction.

It is preferable that the adhesive resin has a softening point, that is, an index based on a melting temperature or a glass transition temperature, within a range of 60° C. or more, and 120° C. or less. For example, the melting temperature of an adhesive resin can be measured in accordance with the method defined in JIS K 7121, and the glass transition temperature of the adhesive resin can be measured in accordance with the method defined in JIS K 7206.

The specific examples of such an adhesive resin can include low density polyethylene (LDPE), poly-α-olefin (polypropylene (PP) and polybutene-1, and etc.), polyacrylate, ethylene-vinyl acetate copolymer (EVA), ethylene-methyl acrylate copolymer (EMA), ethylene-ethyl acrylate copolymer (EEA), ethylene-butyl acrylate copolymer (EBA), ethylene-methyl methacrylate copolymer (EMMA), and an ionomer resin.

In addition, the adhesive resin used can be provided with a core shell structure in which the core includes a various kind of resins or a resin having an adhesiveness at room temperature such as SBR, nitrile rubber (NBR), fluorine rubber and ethylene-propylene rubber, and the shell includes a resin whose melting temperature or softening point is in a range of 60° C. or more, and 120° C. or less. In this case, the shell used can be of an acrylic resin or a polyurethane, etc. Furthermore, the adhesive resin to be used can be one package type of a polyurethane or an epoxy resin, which shows an adhesive property in a range of 60° C. or more, and 120° C. or less.

These resins can be used alone or in combination of two or more kinds as an adhesive resin.

In addition, when an adhesive layer is formed such that substantially no cavities are formed by an adhesive resin, a nonaqueous electrolyte liquid of a battery might be difficult to come into contact with the surfaces of the electrode including a unified separator. Therefore, on the existing surfaces of the adhesive resin of the positive electrode, the negative electrode and the separator, it is preferable that a domain where the adhesive resin exists is formed while forming another domain where it does not. In details, the domain where the adhesive resin exists and the other domain where it does not can be formed in strip form in turn. Alternatively, the adhesive resin can be formed in a discontinuous manner in plural existence domains, e.g., when each domain is in a shape of circle in the plan view. In these cases, the existence areas of the adhesive resin can be located regularly or at random.

On the surfaces having the adhesive resin on the positive electrode, the negative electrode and the separator, it is preferable to form a domain where the adhesive resin exists while forming another domain where it does not. For example, the area (total area) of the domain where the adhesive resin exists can be adjusted such that the peel strength at 180° after heat press of the separator and the electrode falls within the range as explained before. It can fluctuate depending on the kind of the adhesive resin used, but in details, it is preferable that the adhesive resin exists at 10 to 60% of the area of the surface where the adhesive resin exists.

In addition, on the surface where the adhesive resin exists, it is preferable to consider the targeted application weight of the adhesive resin in order to obtain favorable adhesion with the electrode as well as to adjust the peel strength at 180° after hot press of the separator and the electrode within the range as explained before. That is, it is preferable to satisfy 0.05 g/m$^2$ or more and more preferable to satisfy 0.1 g/m$^2$ or more. However, on the surface where the adhesive resin exists, if the targeted application weight of the adhesive resin is too much, a thickness of the electrode body might be excessively increased, or the adhesive resin might block the cavities of the separator to interrupt the migration of ions in the battery. Thus, on the surface where the adhesive resin exists, it is preferable that the targeted application weight of the adhesive resin is 1 g/m$^2$ or less, and more preferably 0.5 g/m$^2$ or less.

The adhesive layer can be formed through a process to apply a composition for forming an adhesive layer (a solution or emulsion of an adhesive resin) on one surface or both surfaces of a porous layer or a laminated body of a porous film (I) and a porous layer (II) to be used as a separator.

As a nonaqueous electrolyte liquid used in the lithium ion secondary battery, a solution as prepared by dissolving a lithium salt in the following nonaqueous solvent can be used.

The examples of the nonaqueous solvent can include aprotic organic solvents such as ethylene carbonate (EC), propylene carbonate (PC), butylene carbonate (BC), dimethyl carbonate (DMC), diethyl carbonate (DEC), methylethyl carbonate (MEC), γ-butyrolactone (γ-BL), 1,2-dimethoxyethane (DME), tetrahydrofuran (THF), 2-methyltetrahydrofuran, dimethyl sulfoxide (DMSO), 1,3-dioxolane, formamide, dimethylformamide (DMF), dioxolane, acetonitrile, nitromethane, methyl formate, methyl acetate, phosphate triester, trimethoxy methane, dioxolane derivative, sulfolane, 3-methyl-2-oxazolidinone, propylene carbonate derivative, tetrahydrofuran derivative, diethyl ether, 1,3-propane sultone, and etc. These can be used alone or in combination of two or more kinds as a mixture solvent.

The examples of the lithium salt contained in the nonaqueous electrolyte liquid can include at least one selected from the groups of lithium salts such as LiClO$_4$, LiPF$_6$, LiBF$_4$, LiAsF$_6$, LiSbF$_6$, LiCF$_3$SO3, LiCF$_3$CO$_2$, Li$_2$C$_2$F$_4$(SO$_3$)$_2$, LiN(CF$_3$SO$_2$)$_2$, LiC(CF$_3$SO$_2$)$_3$, LiC$_n$F$_{2n+1}$SO3 (n≥2) and LiN(RfOSO$_2$)$_2$ (where Rf represents a fluoroalkyl group). The concentration of the lithium salt in the nonaqueous electrolytic solution is preferably 0.6 to 1.8 mol/L, and more preferably 0.9 to 1.6 mol/L.

In addition, the nonaqueous electrolyte liquid can further contain additives in view of further improving the charge discharge cycle characteristics or for the purpose of improving the safety features such as high temperature storage property and overcharge prevention property. The examples of such additives can include vinylene carbonate, vinylethylene carbonate, anhydrous acid, sulfonate, dinitrile, 1,3-propanesultone, diphenyl disulfide, cyclohexylbenzene, biphenyl, fluorobenzene, t-butylbenzene (including derivatives thereof), etc.

Furthermore, the nonaqueous electrolyte liquid can also contain known gelatification agent such as a polymer, so that it can be provided in a gel state (a gelled electrolyte).

The form of the lithium ion secondary battery is not particularly limited. For example, it can be provided in any form including a small size embodiment such as cylindrical form, coin form, button form, flat form and rectangular form, and a large size embodiment for e.g., electric vehicles.

In the lithium ion secondary battery of the present invention, it is possible to use a negative electrode including at least a negative electrode active material which has doped with Li ions, as explained before. However, it is also possible to assemble a battery by using a negative electrode including a negative electrode active material which has not yet been doped with Li ions, and then, the negative electrode active material in the negative electrode composition layer of the negative electrode is doped with Li ions inside the battery (internal system pre-dope).

For example, an internal system pre-dope can be made to a negative electrode active material in a negative electrode composition layer of a negative electrode as follow. For example, separate from a positive electrode and a negative electrode, an electrode having a Li supply source (e.g., lithium metal foil, lithium alloy foil and etc.), that is, an electrode for pre-doping Li ions to the negative electrode active material is provided, with which a battery is assembled. By applying electric current through the electrode, the negative electrode active material in the negative electrode composition layer can be doped with Li ions from the Li supply source inside the battery. Thus, in case of a battery of an embodiment in which Li ions are doped to the negative electrode active material inside a battery through internal system pre-dope, even after completing the pre-dope of Li ions, such an electrode for pre-dope that a part of the Li supply source remains or the whole thereof have disappeared is left inside the battery.

On the other hand, in case where a lithium ion secondary battery is assembled by using a negative electrode including a negative electrode active material which have doped with Li ions by external system pre-dope in advance, the electrode for pre-dope which wa used (or have used) to dope Li ions is not left inside.

In addition, what Li ions have been doped in the negative electrode active material in the negative electrode composition layer of the negative electrode through internal system pre-dope or external system pre-dope can be detected from a molar ratio (Li/M) of the Li and the metal M other than Li included in the positive electrode active material when a battery is discharged at a discharge current rate of 0.1 C until a voltage reaches 2.0 V. In a lithium ion secondary battery, it is preferable to use a negative electrode having adjusted the amounts of Li ions doped in the negative electrode active material in negative electrode composition layer within a range of molar ratio Li/M of 0.7 or more, and 1.05 or less. Meanwhile, it is noted that in case of a battery having a negative electrode whose negative electrode active material in the negative electrode composition layer does not include Li and has not been doped with Li ions through external system pre-dope or internal system pre-dope, it would become usual that a molar ratio Li/M thereof is a value small than the lower limit as defined above.

Also, a quantity of Li ions to be doped in a negative electrode active material at a molar ratio Li/M of 0.7 or more, and 1.05 or less in terms of conversion when it is made into a battery is equivalent to or less than the quantity of the irreversibility capacity of the negative electrode active material.

Also, the composition analysis of the positive electrode active material at the time when it is discharged to reach the voltage of 2.0 V at a discharge current rate of 0.1 C can be carried out by means of ICP (Inductive Coupled Plasma) method as follow. First, 0.2 g of a positive electrode active material as a measurement target is taken out and put into a 100 mL container. Then, 5 mL of pure water, 2 mL of aqua regia, and 10 mL of pure water are sequentially added in the order to cause heat solution, followed by cooling and diluting 25 times with pure water. An ICP analyzer, "ICP-757" manufactured by JARRELASH Co., Ltd. is used to carry out a composition analysis by a calibration curve method. The quantities of the composition can be identified from the results as obtained. The Molar ratio Li/M in the Examples discussed later is measured by the method above.

In addition, regarding the positive electrode active material in terms of defining a molar ratio Li/M described in the instant specification, it shall include a positive electrode material in which the surface of the particles of the positive electrode active material is coated with a specific material (Al-containing oxide and etc.). In this case, a quantity of metal M included in such a specific material existing on a surface of the positive electrode material should be included in the quantity of metal M to define a molar ratio Li/M.

For example, an example of the molar ratio Li/M can be explained with reference to Example 1 described later. Example 1 uses a positive electrode material (a1) having formed a coating film of an Al-containing oxide on the surface of $LiCo_{0.9795}Mg_{0.011}Zr_{0.0005}Al_{0.009}O_2$, that is, a lithium cobalt oxide (A1), and a positive electrode material (b1) having formed a coating film of an Al-containing oxide on the surface of $LiCo_{0.97}Mg_{0.012}Al_{0.009}O_2$, that is, a lithium cobalt oxide (B1). In this case, the metal M other than Li refers to Co, Mg, Zr and Al. In other words, after preparing a lithium ion secondary battery and after subjecting to predetermined charge discharge processes, the battery is disassembled to take the positive electrode material (that is, a mixture in Example 1) from the positive electrode composition layer, which is analyzed to obtain the molar ratio Li/M.

In case of a battery to be assembled by using a negative electrode having a negative electrode active material having doped with Li ions through an external system pre-dope, in which the degree of the Li ion dope is adjusted within the range of the molar ratio Li/M defined above in a positive electrode active material, or in case of a battery adjusted in such a way that its negative electrode active material is doped with Li ions through an internal system pre-dope and its positive electrode active material has adjusted its molar ratio Li/M within the range defined above, it can be said that Li ions at an appropriate quantity has been doped in view of reducing the irreversibility capacity of the negative electrode active material. As a result, for example, a generation of a Li dendrite can be restricted, and thereby favorably avoiding micro short circuit of the battery due to such a generation.

EXAMPLES

Hereinafter, the present invention is described in more detail based on the examples. It is, however, noted that the following examples should not be used to narrowly construe the scope of the present invention.

Example 1

<Preparation of Positive Electrode>

$Li_2CO_3$ as a Li-containing compound, $Co_3O_4$ as a Co-containing compound, $Mg(OH)_2$ as a Mg-containing compound, $ZrO_2$ as a Zr-containing compound, and $Al(OH)_3$ as an Al-containing compound were put into a mortar at an appropriate mixture ratio, and mixed and hardened into a pellet form. Using a muffle furnace, it was burned at 950° C. in the atmosphere (in the atmospheric pressure) for 24 hours. Thereby obtained was a lithium cobalt oxide (A1) whose composition formula was found to be $LiCo_{0.9795}Mg_{0.011}Zr_{0.0005}Al_{0.009}O_2$ by means of the ICP (Inductive Coupled Plasma) method.

Then, into 200 g of a lithium hydroxide aqueous solution at a pH of 10 and at a temperature of 70° C., 10 g of the lithium cobalt oxide (A1) was put. After stirring for dispersion, 0.154 g of $Al(NO_3)_3 \cdot 9H_2O$ and an ammonium solution to suppress a pH fluctuation were dropped over a period of 5 hours, to produce an Al(OH)$_3$ coprecipitation matter, so as to adhere it to the surface of the lithium cobalt oxide (A1). Then, the lithium cobalt oxide (A1) that the Al(OH)$_3$ coprecipitation matters were attached to was taken out from the reaction liquid. After washing and drying, a heat treatment was carried out at a temperature of 400° C. in the atmosphere for ten hours, thereby obtaining a positive electrode material (a1) in which a coating film of the Al-containing oxide was formed on the surface of the lithium cobalt oxide (A1).

With respect to the positive electrode material (a1) obtained, its average particle diameter was measured by means of the method as described before, thereby finding that it was 27 μm.

Li$_2$CO$_3$ as a Li-containing compound, Co$_3$O$_4$ as a Co-containing compound, Mg(OH)$_2$ as a Mg-containing compound, and Al(OH)$_3$ as an Al-containing compound were put into a mortar at an appropriate mixture ratio, and mixed and hardened into a pellet form. Using a muffle furnace, it was burned at 950° C. in the atmosphere (in the atmospheric pressure) for 4 hours. Thereby obtained was a lithium cobalt oxide (B1) whose composition formula was found to be LiCo$_{0.97}$Mg$_{0.012}$Al$_{0.009}$O$_2$ by means of the ICP method.

Then, into 200 g of a lithium hydroxide aqueous solution at a pH of 10 and at a temperature of 70° C., 10 g of the lithium cobalt oxide (B1) was put. After stirring for dispersion, 0.077 g of Al(NO$_3$)$_3$·9H$_2$O and an ammonium solution to suppress a pH fluctuation were dropped over a period of 5 hours, to produce an Al(OH)$_3$ coprecipitation matter, so as to adhere it to the surface of the lithium cobalt oxide (B1). Then, the lithium cobalt oxide (B1) that the Al(OH)$_3$ coprecipitation matters were attached to was taken out from the reaction liquid. After washing and drying, a heat treatment was carried out at a temperature of 400° C. in the atmosphere for ten hours, thereby obtaining a positive electrode material (b1) in which a coating film of the Al-containing oxide was formed on the surface of the lithium cobalt oxide (B1).

With respect to the positive electrode material (b1) obtained, its average particle diameter was measured by means of the method as described before, thereby finding that it was 7 μm.

Then, the positive electrode material (a1) and the positive electrode material (b1) were mixed at a mass ratio of 85:15 to obtain a positive electrode material (1) for battery preparation. The average coating thickness of the Al-containing oxide formed on the surface of the positive electrode material (1) was measured by means of the method described before, thereby finding that it was 30 rm. In addition, when measuring the average coating thickness, the composition of the coating film was analyzed by an element mapping method, thereby confirming that the main component was Al$_2$O$_3$. Furthermore, the positive electrode material (1) was analyzed on the particle size distribution by volume standard. It was found that its average particle diameter was 25 μm, and that there were two peaks, each having the peak top corresponding to the average particle diameter of the positive electrode material (a1) or the positive electrode material (b1). In addition, the BET specific surface area of the positive electrode material (1) was measured by using a specific surface area measurement device by means of a nitrogen adsorption method, thereby confirming that it was 0.25 m$^2$/g.

96.5 parts by mass of the positive electrode material (1), 20 parts by mass of an NMP solution containing P(VDF-CTFE) as a binder at a concentration of 10 mass %, and 1.5 parts by mass of acetylene black as a conductive assistant were kneaded with a twin screw extruder, into which an NMP was further added to adjust a viscosity, so as to prepare a positive electrode composition containing paste. This paste was coated on both surfaces of an aluminum foil having a thickness of 15 μm, and then dried at 120° C. for 12 hours in vacuum to obtain a positive electrode composition layer having formed on both surfaces of the aluminum foil. It was then subject to a press work and cut into a predetermined size to obtain a positive electrode in a belt shape. When applying the positive electrode composition containing paste on the aluminum foil, it was configured in such a way that the aluminum foil was partly exposed. When the positive electrode composition containing paste was applied on a surface of the aluminum foil, the applied part thereof on one surface corresponded to that of the back surface thereof. The thickness of the positive electrode composition layer of the positive electrode (a thickness per one surface the aluminum foil) as obtained was 55 μm.

The positive electrode in the belt shape having formed the positive electrode composition layer on both surfaces of the aluminum foil were punched with a Thompson blade, in such a way that the exposed part of the aluminum foil (i.e., the positive electrode current collector) was partly projected to become a tab part, and that the application part of the positive electrode composition layer was shaped into nearly a quadrangle having curved and rounded its four corners. Thereby obtained was a positive electrode for batteries having a positive electrode composition layer formed on both surfaces of the positive electrode current collector. FIG. 1 is a plan view schematically showing the positive electrode for batteries (here, the size of the positive electrode shown in FIG. 1 does not necessarily correspond to the actual size in order to make it easy to understand the structure of the positive electrode). The positive electrode 10 has a shape serving as a tab part 13 formed by being punched in such a way that a part of the exposed part of the positive electrode current collector 12 was projected. The shape of the application part of the positive electrode composition layer 11 has nearly a quadrangle having the four corners rounded. Each length of a, b and c in the drawing was 8 mm, 37 mm and 2 mm, respectively.

<Preparation of Negative Electrode>

An aqueous solution of copolymer (A) was prepared as follow. The copolymer (A) consisted of a unit represented by formula (1) and a unit represented by formula (2), in which R in the formula (2) was hydrogen and M' was potassium. The copolymer (A) had a molar ratio of 6/4 with respect to the unit represented by formula (1) and the unit represented by formula (2). The copolymer (A) was dissolved in ion exchanged water, and had a concentration of the copolymer (A) of 8 mass %. Into the aqueous solution, complex Si-1 and hardly-graphitizable carbon HC-1 as a negative electrode active material, and carbon black as a conductive assistant were added and stirred to mix them to obtain a negative electrode composition containing paste. Here, the complex Si-1 included SiO whose surfaces were coated with a carbon material. Complex Si-1 had an average particle size of 5 μm, a specific surface area of 8.8 m$^2$/g, in which the quantity of the carbon material in the complex was 10 parts by mass with respect to 100 parts by mass of SiO. The hardly-graphitizable carbon HC-1 (average particle size was 8 μm) had d$_{002}$ of 0.346 nm in an X-ray diffraction. In addition, the paste above had a composition ratio (a mass ratio) of (complex Si-1):(HC-1):(carbon black):(copolymer (A)) being 81:9:2:8. In addition, in case of the negative electrode used for the lithium ion secondary battery of the Example 1, the ratio of complex Si-1 was 90 mass %, and the ratio of HC-1 was 10 mass %, assuming that the whole quantities in the negative electrode active material was 100 mass %.

The negative electrode composition containing paste was applied on a copper foil having a thickness of 10 μm, and dried to form a negative electrode composition layer formed on the one surface of the copper foil. After a press work process was applied to adjust the density of the negative electrode composition layer to be 1.2 g/cm$^3$, followed by cutting it with a predetermined size, to obtain a negative electrode having a belt shape. Here, when the negative electrode composition containing paste is coated on the copper foil, it was done such that the copper foil was partly exposed. When the negative electrode composition layer was formed on the both surfaces, a portion on the front surface where it was coated with should have been correspondingly coated on the back surface.

Figure 2:
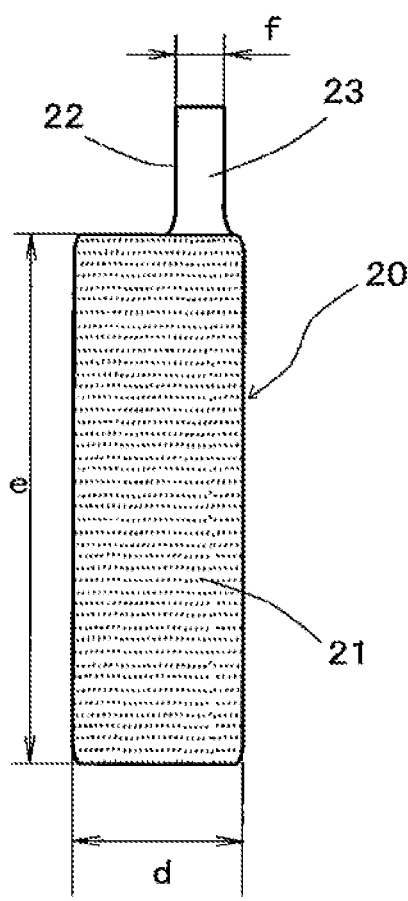
FIG. 2 is a plan view schematically showing an example of the negative electrode of the lithium ion secondary battery of the present invention.

The negative electrode in the belt shape as explained above was punched with a Thompson blade, in such a way that the exposed part of the copper foil (i.e., the negative electrode current collector) was partly projected to become a tab part, and that the application part of the negative electrode composition layer was shaped into nearly a quadrangle having curved and rounded its four corners. Thereby obtained was a negative electrode for batteries having a negative electrode composition layer formed on both surfaces and one surface of the negative electrode current collector. FIG. 2 is a plan view schematically showing the negative electrode for batteries (note that the size of the negative electrode shown in FIG. 2 does not necessarily correspond to the actual size in order to make it simplify the understanding of the structure of the negative electrode). The negative electrode 20 has a shape serving as a tab part 23 formed by being punched in such a way that a part of the exposed part of the negative electrode current collector 22 was projected. The shape of the formation part of the negative electrode composition layer 21 has nearly a quadrangle having the four corners curved. Each length of d, e and f in the drawing was 9 mm, 38 mm and 2 mm, respectively.

<Preparation of Separator>

3 parts by mass of a denatured polybutylacrylate as a resin binder, 97 parts by mass of boehmite powders (average particle diameter was 1 μm), and 100 parts by mass of water were mixed to prepare a slurry for forming a porous layer (II). This slurry was applied on one surface of a fine porous membrane made of polyethylene for lithium ion batteries having a thickness of 12 μm [a porous layer (I)], and dried. There was prepared a separator in which one surface of the porous layer (I) was provided with the porous layer (II) mainly constituted by boehmite. It is noted that the thickness of the porous layer (II) was 3 μm.

There were provided two sheets of the negative electrodes for batteries having formed the negative electrode composition layer on one surface of the negative electrode current collector; 16 sheets of the negative electrodes for batteries having formed the negative electrode composition layer on both surfaces of the negative electrode current collector; 17 sheets of the positive electrodes for batteries having formed the positive electrode composition layer on both surfaces of the positive electrode current collector. Furthermore, a stacked electrode body was obtained by alternately disposing the negative electrodes for batteries having formed the negative electrode composition layer on one surface of the negative electrode current collector, the positive electrodes for batteries having formed the positive electrode composition layer on both surfaces of the positive electrode current collector, and the negative electrodes for batteries having formed the negative electrode composition layer on both surfaces of the negative electrode current collector. Here, each separator was disposed between each positive electrode and each negative electrode in a manner that the porous layer (II) faces the positive electrode.

Tab parts of the positive electrodes were welded together, and tab parts of the negative electrode were welded together. A aluminum laminate film having a thickness of 0.15 mm, a width of 34 mm, a height of 50 mm and a cavity to house the stacked electrode body 50 was provided. Into the cavity, the stacked electrode body was inserted, and on the top, another aluminum laminate film having the same size was placed. The three sides of the aluminum laminate films were welded together. Then, from the rest of the sides of the aluminum laminate films, a nonaqueous electrolyte liquid (i.e., a solution made by providing a mixture solvent of ethylene carbonate and diethyl carbonate at a volume ratio of 30:70, into which LiPF$_6$ was dissolved at a concentration of 1 mol/L, followed by adding 4 mass % of vinylene carbonate, 5 mass % of 4-fluoro-1,3-dioxolane-2-one, 0.5 mass % of adiponitrile, and 0.5 mass % of 1,3-dioxane) was injected. Then, the remaining one side of the aluminum laminated films was sealed by means of a vacuum heat process. Thereby obtained was a lithium ion secondary battery having an appearance shown in FIG. 3, and a cross sectional structure shown in FIG. 4.

Figure 3:
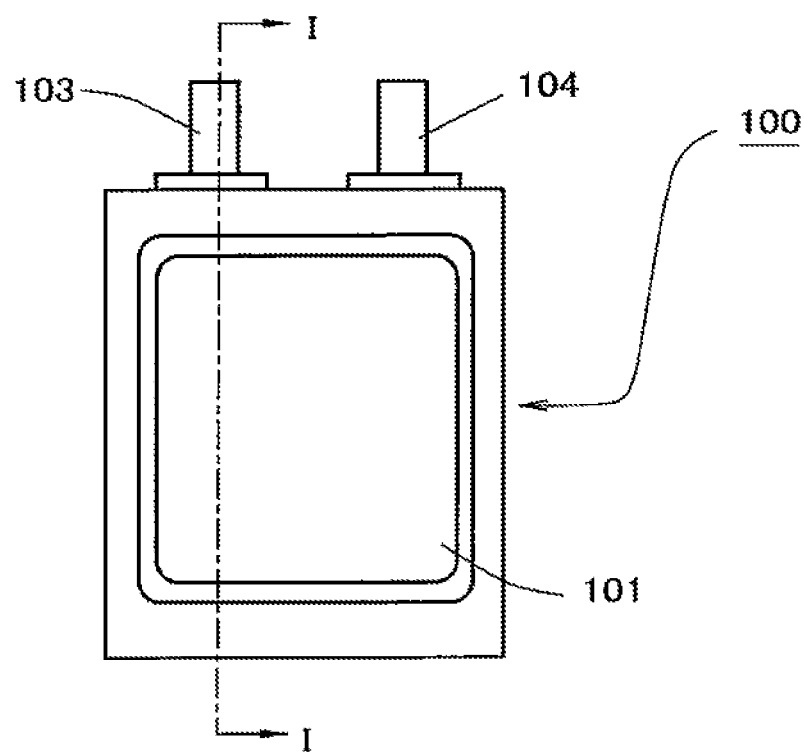
FIG. 3 is a plan view schematically showing an example of the lithium ion secondary battery of the present invention.
Figure 4:
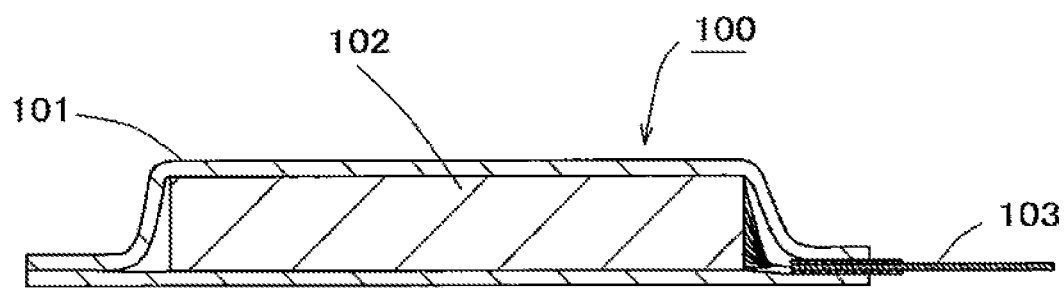
FIG. 4 is a cross section view at the line I-I of FIG. 3.

FIG. 3 and FIG. 4 are explained here. FIG. 3 is a plan view schematically showing a lithium ion secondary battery, and FIG. 4 is a cross section view at line I-I of FIG. 3. The lithium ion secondary battery 100 has a structure below. Inside the aluminum laminate film exterior body 101 composed of two sheets of aluminum laminate films, there are provided the stacked electrode body 102, and the nonaqueous electrolyte liquid (not shown). The aluminum laminate film exterior body 101 has a structure in which the outer periphery thereof is sealed by heat fusion of the aluminum laminate films at the top and the bottom thereof. It is noted that in FIG. 4, illustration of the drawing is simplified so that it does not distinctively illustrate each layer constituting the aluminum laminate film exterior body 101, and the positive electrode, negative electrode and a separator constituting the stacked electrode body 102.

The positive electrodes in the stacked electrode body 102 are connected with each other by welding the tab parts to be unified. The unified body of the tab parts welded in this way is connected to the positive electrode external terminal 103 inside battery 100. In addition, while not illustrated, the negative electrodes in the stacked electrode body 102 are also connected with each other by welding the tab parts to be unified, and the unified body of the tab parts welded in this way is connected to the negative electrode external terminal 104 inside battery 100. Then, each one end of the positive electrode external terminal 103 and the negative electrode external terminal 104 is drawn outside the aluminum laminate film exterior body 101 in order to be capable of connection to external devices.

Example 2

Except for making a composition ratio (a mass ratio) of (complex Si-1):(hardly-graphitizable carbon HC-1):(carbon black):(copolymer (A)) to be 72:18:2:8, the same procedure as Example 1 was carried out to prepare a negative electrode composition containing paste, and except for using this paste, the same procedure as Example 1 was carried out to prepare a lithium ion secondary battery. In addition, in case of the negative electrode used for the lithium ion secondary battery of the Example 2, the ratio of complex Si-1 was 80 mass %, and the ratio of HC-1 was 20 mass %, assuming that the whole quantities in the negative electrode active material were 100 mass %.

Example 3

Except for making a composition ratio (a mass ratio) of (complex Si-1):(hardly-graphitizable carbon HC-1):(carbon black):(copolymer (A)) to be 63:27:2:8, the same procedure as Example 1 was carried out to prepare a negative electrode composition containing paste, and except for using this paste, the same procedure as Example 1 was carried out to prepare a lithium ion secondary battery. In addition, in case of the negative electrode used for the lithium ion secondary battery of the Example 3, the ratio of complex Si-1 was 70 mass %, and the ratio of HC-1 was 30 mass %, assuming that the whole quantities in the negative electrode active material were 100 mass %.

Example 4

Except for making a composition ratio (a mass ratio) of (complex Si-1):(hardly-graphitizable carbon HC-1):(carbon black):(copolymer (A)) to be 54:36:2:8, the same procedure as Example 1 was carried out to prepare a negative electrode composition containing paste, and except for using this paste, the same procedure as Example 1 was carried out to prepare a lithium ion secondary battery. In addition, in case of the negative electrode used for the lithium ion secondary battery of the Example 4, the ratio of complex Si-1 was 60 mass %, and the ratio of HC-1 was 40 mass %, assuming that the whole quantities in the negative electrode active material were 100 mass %.

Example 5

Except for making a composition ratio (a mass ratio) of (complex Si-1):(hardly-graphitizable carbon HC-1):(carbon black):(copolymer (A)) to be 45:45:2:8, the same procedure as Example 1 was carried out to prepare a negative electrode composition containing paste, and except for using this paste, the same procedure as Example 1 was carried out to prepare a lithium ion secondary battery. In addition, in case of the negative electrode used for the lithium ion secondary battery of the Example 5, the ratio of complex Si-1 was 50 mass %, and the ratio of HC-1 was 50 mass %, assuming that the whole quantities in the negative electrode active material were 100 mass %.

Example 6

Except for replacing Si-1 with a material Si-2 (which had an average particle size of 5 μm, and a specific surface area of 6.8 m$^2$/g) in which surfaces of SiO had not been coated with a carbon material, the same procedure as Example 5 was carried out to prepare a lithium ion secondary battery.

Example 7

Except for replacing HC-1 with a hardly-graphitizable carbon HC-2 (an average particle size of 12 μm) which had $d_{002}$ of 0.380 nm in an X-ray diffraction, the same procedure as Example 5 was carried out to prepare a lithium ion secondary battery.

Example 8

In addition to Si-1 and HC-1, this Example added a graphite G-1 (a graphite in which the surfaces of mother particles of natural graphite were coated with an amorphous carbon made from a pitch as a carbon source. It had an average particle diameter of 10 μm, $d_{002}$ of 0.336 nm, a specific surface area of 3.9 m$^2$/g by means of a BET method, and an R value of 0.40 by means of an argon ion laser Raman spectrum). The composition ratio (mass ratio) of (complex Si-1):(hardly-graphitizable carbon HC-1):(graphite G-1):(carbon black):(copolymer (A)) was 54:32:4:2:8. Except for the notes above, the same procedure as Example 1 was carried out to prepare a negative electrode composition containing paste, and except for using this paste, the same procedure as Example 1 was carried out to prepare a lithium ion secondary battery. In addition, in case of the negative electrode used for the lithium ion secondary battery of the Example 8, the ratio of complex Si-1 was 60 mass %, the ratio of HC-1 was 35 mass %, and the ratio of graphite G-1 was 5 mass %, assuming that the whole quantities in the negative electrode active material were 100 mass %.

Example 9

Except for making a composition ratio (a mass ratio) of (complex Si-1):(hardly-graphitizable carbon HC-1):(graphite G-1):(carbon black):(copolymer (A)) to be 45:41:4:2:8, the same procedure as Example 1 was carried out to prepare a negative electrode composition containing paste, and except for using this paste, the same procedure as Example 1 was carried out to prepare a lithium ion secondary battery. In addition, in case of the negative electrode used for the lithium ion secondary battery of the Example 9, the ratio of complex Si-1 was 50 mass %, the ratio of HC-1 was 45 mass %, and the ratio of graphite G-1 was 5 mass %, assuming that the whole quantities in the negative electrode active material were 100 mass %.

Example 10

<Preparation of Third Electrode>

Figure 5:
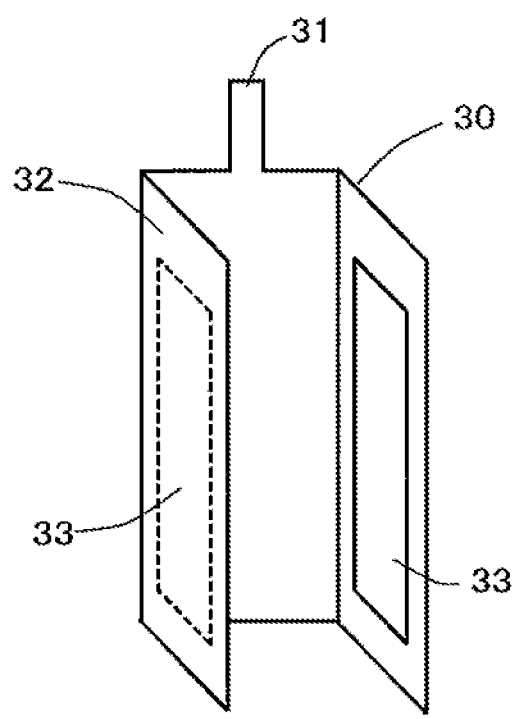
FIG. 5 is a perspective view schematically showing an example of a third electrode that can be used in the lithium ion secondary battery of the present invention.

A third electrode 30 (an electrode for pre-dope) having a shape shown in FIG. 5 was prepared as follow. A copper foil having a through hole penetrating from one surface thereof to the other surface thereof (its thickness was 10 μm, the diameter of the through hole was 0.1 mm, and the pore rate was 47%) was cut into a size of 45×25 mm, thereby obtaining a third electrode current collector 32 having a third electrode tab part 31 with a size of 2×2 mm. Furthermore, a Li foil 33, 33 having a thickness of 200 μm and a mass of 18 mg was pressed to adhere to the portion close to both ends of the third electrode current collector 32, which was then folded into an alphabet character C such that the Li foils 33, 33 were located inside, thereby obtaining the third electrode 30.

<Assembling of Battery>

Figure 6:
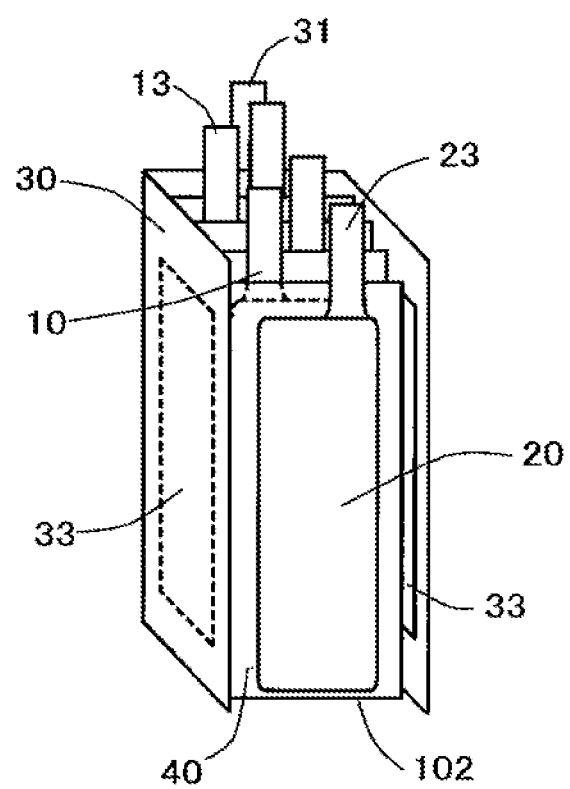
FIG. 6 is a perspective view showing a condition where a stacked electrode body is obtained by stacking a positive electrode and a negative electrode with intervention of a separator therebetween, which is assembled with the third electrode of FIG. 5.

Next, a stacked electrode body prepared in the same manner as Example 2 was used, but to further stack it with the third electrode, thereby preparing an electrode body. FIG. 6 schematically illustrates a perspective view of a state where the electrode body 102 and third electrode 30 are stacked. When the third electrode 30 is stacked on the electrode body 102, the position relation of the electrode body 102 and the third electrode 30 is configured in the same manner as shown in FIG. 6. Namely, there is such a position relation that the end face of the stacked electrode body 102 is opposed to the Li foil 33, 33.

Figure 7:
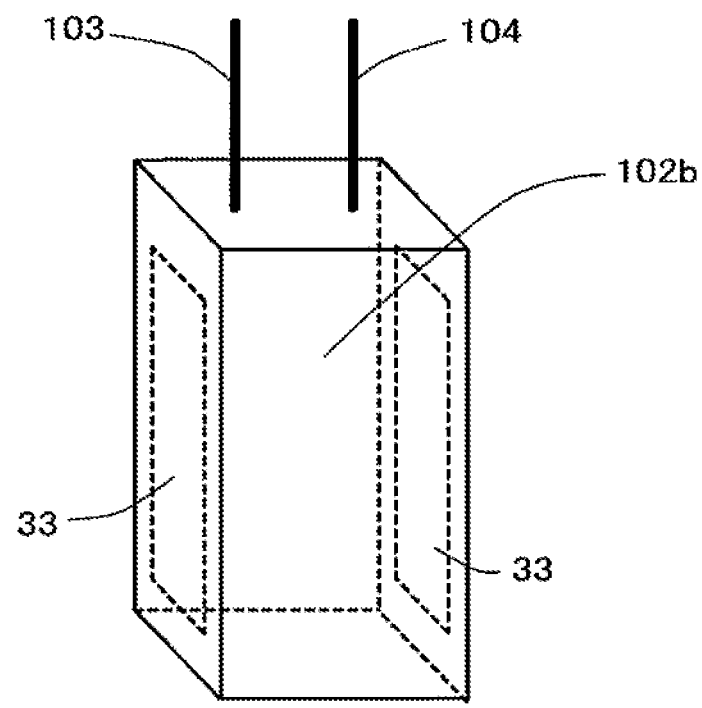
FIG. 7 is a perspective view schematically showing an example of the electrode body of the lithium ion secondary battery of the present invention.

Furthermore, with respect to the stacked body obtained by stacking the stacked electrode body 102 on the third electrode 30, the tab parts of the positive electrodes for batteries were welded to make a unified body, which was then welded to the positive electrode external terminal of the battery. Also, with respect to the stacked body, the tab parts of the negative electrodes for batteries and the third electrode were welded to make a unified body, which was then welded to the negative electrode external terminal for battery, thereby obtaining an electrode body. FIG. 7 schematically shows a perspective view showing the electrode body as obtained. In FIG. 7, the drawing does not illustrate a stacked body having stacked the positive electrode, the negative electrode and the separator, but the following configurations are included. The electrode body 102*b* includes the third electrode stacked on the stacked body in such a manner that the end surfaces of the stacked body are opposed to the Li foils 33, 33. In addition, all of the positive electrode tab parts of the positive electrode in the stacked body are integrally welded to form a unified body, which is welded to the positive electrode external terminal 103. Also, all of the negative electrode tab parts of the negative electrode and the tab part of the third electrode in the stacked body are integrally welded to form a unified body, which is welded to the negative electrode external terminal 104. Then, the positive electrode external terminal 103 and the negative electrode external terminal 104 are drawn from the main body of the electrode body 102.

Except for replacing the stacked electrode body with the electrode body as mentioned above (i.e., the electrode body with the third electrode), the same procedure as Example 2 was carried out to prepare a lithium ion secondary battery. Then, the lithium ion secondary battery thus prepared was kept in a constant temperature bath at 45° C. for 1 week.

Comparative Example 1

In this Example, the hardly-graphitizable carbon HC-1 was not added [namely, it had a composition ratio (a mass ratio) of (complex Si-1):(carbon black):(copolymer (A)) as being 90:2:8]. Other than the notes above, the same procedure as Example 1 was carried out to prepare a negative electrode composition containing paste, and except for using this paste, the same procedure as Example 1 was carried out to prepare a lithium ion secondary battery. Namely, in the negative electrode used for the lithium ion secondary battery of Comparative Example 1, the whole amounts of the negative electrode active material (100 mass %) were of the complex Si-1.

Comparative Example 2

Except for making a composition ratio (a mass ratio) of (complex Si-1):(hardly-graphitizable carbon HC-1):(carbon black):(copolymer (A)) to be 36:54:2:8, the same procedure as Example 1 was carried out to prepare a negative electrode composition containing paste, and except for using this paste, the same procedure as Example 1 was carried out to prepare a lithium ion secondary battery. In addition, in the negative electrode used for the lithium ion secondary battery of Comparative Example 2, the ratio of complex Si-1 was 40 mass %, and the ratio of HC-1 was 60 mass %, assuming that the whole quantities in the negative electrode active material were 100 mass %.

Comparative Example 3

In this Example, graphite G-1 was added in addition to Si-1 and HC-1. Then, except for making a composition ratio (a mass ratio) of (complex Si-1):(hardly-graphitizable carbon HC-1):(graphite G-1):(carbon black):(copolymer (A)) to be 45:4:41:2:8, the same procedure as Example 1 was carried out to prepare a negative electrode composition containing paste, and except for using this paste, the same procedure as Example 1 was carried out to prepare a lithium ion secondary battery. In addition, in the negative electrode used for the lithium ion secondary battery of Comparative Example 3, the ratio of complex Si-1 was 50 mass %, the ratio of HC-1 was 5 mass %, and the ratio of graphite G-1 was 45 mass %, assuming that the whole quantities in the negative electrode active material was 100 mass %.

Various properties as explained below were evaluated on the lithium ion secondary batteries of the Examples and the Comparative Examples, as well as the negative electrodes thereof.

<Initial Capacity Measurement>

Ten lithium ion secondary batteries from each of the Examples and the Comparative Examples were charged by being applied to apply to a constant current charge at a current value of 0.5 C to reach 4.4 V, followed by applying a constant voltage of 4.4 V to reach a current value of 0.02 C. Then, the battery was discharged at a constant current of 0.2 C to reach 2.0 V to obtain an initial discharge capacity. The results are shown in Table 1.

<Evaluation on Charge Discharge Cycle Characteristic>

Then, with respect to five batteries each having measured the initial discharge capacity above, each battery was charged at a constant current at a current value of 1 C to reach 4.4 V, and then charged at a constant voltage of 4.4 V to reach a current value of 0.05 C, and then discharged at a current value of 1 C to reach a voltage of 2.0 V. These sequential steps were assumed as one cycle. This cycle was repeated 300 times. Then, each battery was subject to a constant-current constant-voltage charge and a constant-current discharge at the conditions same as measured the initial discharge capacity, thereby obtaining a discharge capacity. Then, the value of the discharge capacity was divided by the value of the initial discharge capacity to show it as a percentage, that is, a capacity maintenance rate. The results of the five samples of each example were averaged. The results are shown in Table 1.

<Evaluation of Expansion Rate of Negative Electrode>

With respect to each battery having measured the initial discharge capacity above and each battery having repeated the charge discharge cycle 300 times, each was charged by being applied to applied to a constant current charge at a current value of 0.5 C to reach 4.4 V, followed by applying a constant voltage of 4.4 V to reach a current value of 0.02 C. Each battery charged was disassembled to take out the negative electrode, which was immersed in diethyl carbonate to wash, followed by applying it to vacuum dry. The thickness of the negative electrode after dry was measured with a micrometer. The thickness of the negative electrode after the 300 cycles was divided by the thickness of the negative electrode after the initial capacity measurement to obtain a value shown as a percentage, which was an expansion rate of the negative electrode. The results are shown in Table 1.

TABLE 1

|  | Initial Capacity | Charge Discharge Cycle Characteristic; capacity maintenance rate | expansion rate of negative electrode |
|---|---|---|---|
| Example 1 | 95 | 87 | 108 |
| Example 2 | 90 | 90 | 107 |
| Example 3 | 87 | 92 | 106 |
| Example 4 | 85 | 94 | 105 |
| Example 5 | 83 | 95 | 102 |
| Example 6 | 83 | 95 | 102 |
| Example 7 | 83 | 95 | 102 |
| Example 8 | 85 | 92 | 106 |
| Example 9 | 83 | 93 | 105 |
| Example 10 | 125 | 92 | 107 |
| Comparative Example 1 | 100 | 70 | 150 |
| Comparative Example 2 | 70 | 85 | 100 |
| Comparative Example 3 | 72 | 84 | 130 |

As showed in Table 1, each of the lithium ion secondary batteries of Examples 1 to 10 in which material Sand hardly-graphitizable carbon were included as a negative electrode active material in an appropriate ratio showed a large value of the initial capacity and restricted the expansion of the negative electrode due to the charge discharge cycles, which thereby contributed to keeping the capacity maintenance rate high in the charge discharge cycle characteristic evaluation, and therefore, it can be concluded that these samples were excellent in the charge discharge cycle characteristic.

By contrast, the negative electrode of Comparative Example 1 did not include the hardly-graphitizable carbon, and the negative electrode of Comparative Example 3 included the hardly-graphitizable carbon only at a less ratio in the negative electrode active material. The batteries of these comparative examples had a larger expansion rate of the negative electrode due to the charge discharge cycles, which thereby contributed to a low capacity maintenance rate in the charge discharge cycle characteristic evaluation, Also, the negative electrode of Comparative Example 2 included the hardly-graphitizable carbon at an excessive ratio in the negative electrode active material. The battery of Comparative Example 2 showed an initial capacity smaller than those of the Examples.

There are other embodiments than the description above without departing the gist of the present invention. The embodiment described above is an example, and the present invention is not limited to the embodiment. The scope of the present invention should be construed primarily based on the claims, not to the description of the specification or the present application. Any changes within the ranges of the claims and the equivalence thereof should be construed as falling within the scope of the claims.

INDUSTRIAL UTILITY

The lithium ion secondary battery of the present invention can be used as the same applications as those of conventionally known lithium ion secondary batteries.

EXPLANATION OF THE REFERENCES IN THE DRAWINGS

10: Positive electrode;
11: Positive electrode composition layer;
12: Positive electrode current collector;
13: Tab part;
20: Negative electrode;
21: Negative electrode composition layer;
22: Negative electrode current collector;
23: Tab part;
30: Third electrode;
31: Third electrode tab part;
32: Third electrode current collector;
33: Li supply source (Li foil)
40: Separator;
100: Lithium ion secondary battery;
101: Metal laminate film exterior body;
102: Stacked electrode body;
103: Positive electrode external terminal: and
104: Negative electrode external terminal.

What is claimed is:

1. A lithium ion secondary battery, comprising:
a positive electrode;
a negative electrode comprising a negative electrode composition layer comprising a negative electrode active material, the negative electrode composition layer provided on at least one surface of a current collector made of a metal foil;
a separator provided between the positive electrode and the negative electrode; and
a nonaqueous electrolyte liquid,
wherein 100 mass % of the negative electrode active material contained in the negative electrode composition layer consists of:
50-80 mass % of a composite material S consisting of Si and a first carbon material;
20-50 mass % of a second carbon material of hardly-graphitizable carbon materials; and
optionally, graphite
wherein the composite material S and the second carbon material are provided separately before mixing the composite material S with the second carbon material,
wherein the lithium ion secondary battery has a charge discharge cycle capacity maintenance rate of 90 to 95%.

2. The lithium ion secondary battery according to claim 1, wherein the hardly-graphitizable carbon material has $d_{002}$ of 0.34 to 0.42 nm in an X-ray diffraction.

3. The lithium ion secondary battery according to claim 1, wherein $SiO_x$ (0.5≤x≤1.5) is included as the material S.

4. The lithium ion secondary battery according to claim 3, wherein the $SiO_x$ constitutes a complex with a carbon material.

5. The lithium ion secondary battery according to claim 1, wherein at least a part of the negative electrode active material contained in the negative electrode composition layer has been doped with Li ions.

6. The lithium ion secondary battery according to claim 1, wherein the charge discharge cycle capacity maintenance rate is measure by a method comprising:
Step A of charging the lithium ion secondary battery by applying a constant current charge at a current value of 0.5 C to reach 4.4 V, followed by applying a constant voltage of 4.4 V to reach a current value of 0.02 C, followed by discharging the lithium ion secondary battery at a constant current of 0.2 C to reach 2.0 V, thereby obtaining a discharge capacity A;
Step B of conducing a cycle of charge and discharge with respect to the lithium ion secondary battery after the Step A, wherein the cycle comprises one cycle comprising:

charging the lithium ion secondary battery at a constant current at a current value of 1 C to reach 4.4 V;

then charging the lithium ion secondary battery at a constant voltage of 4.4 V to reach a current value of 0.05 C;

then discharging the lithium ion secondary battery at a current value of 1 C to reach a voltage of 2.0 V;

wherein said one cycle is repeated 300 times;

wherein the lithium ion secondary battery after the Step B is charged by applying a constant current charge at a current value of 0.5 C to reach 4.4 V, followed by applying a constant voltage of 4.4 V to reach a current value of 0.02 C, followed by discharging the lithium ion secondary battery at a constant current of 0.2 C to reach 2.0 V, thereby obtaining a discharge capacity B;

wherein the capacity maintenance rate is obtained by a formula below:

(capacity maintenance rate)=(discharge capacity B)/(discharge capacity A)×100.

7. The lithium ion secondary battery according to claim 6, wherein at least a part of the negative electrode active material contained in the negative electrode composition layer has been doped with Li ions.

* * * * *